United States Patent
Kim et al.

(10) Patent No.: US 10,912,179 B2
(45) Date of Patent: Feb. 2, 2021

(54) SYSTEMS AND METHODS FOR CONTEXTUAL INTELLIGENCE USING NETWORKED DEVICES

(71) Applicant: Belkin International, Inc., Playa Vista, CA (US)

(72) Inventors: Ryan Yong Kim, Rolling Hills Estates, CA (US); Brian Van Harlingen, Torrance, CA (US)

(73) Assignee: Belkin International, Inc., Playa Vista, CA (US)

( * ) Notice: Subject to any disclaimer, the term of this patent is extended or adjusted under 35 U.S.C. 154(b) by 0 days.

(21) Appl. No.: 16/525,063

(22) Filed: Jul. 29, 2019

(65) Prior Publication Data
US 2019/0357339 A1    Nov. 21, 2019

Related U.S. Application Data

(63) Continuation-in-part of application No. 16/418,695, filed on May 21, 2019, now Pat. No. 10,455,670, (Continued)

(51) Int. Cl.
*H05B 47/19* (2020.01)
*H04Q 9/00* (2006.01)
(Continued)

(52) U.S. Cl.
CPC ............ *H05B 47/19* (2020.01); *G08C 17/02* (2013.01); *H04Q 9/00* (2013.01); *H05B 47/105* (2020.01);
(Continued)

(58) Field of Classification Search
CPC combination set(s) only.
See application file for complete search history.

(56) References Cited

U.S. PATENT DOCUMENTS

| 5,239,205 A | 8/1993 | Hoffman et al. |
| 6,771,182 B1 | 8/2004 | Loh et al. |

(Continued)

FOREIGN PATENT DOCUMENTS

WO    2015-200689 A1    12/2015

OTHER PUBLICATIONS

ISY-99i/ISY-26 INSTEON:Scene—Universal Devices, Inc. Wiki, accessed Jan. 26, 2D15, retrieved from https://web.archive.org/web/2D15D6D5222D33/http://wiki.universal-devices.com/index.php?title=ISY-99i/ISY- 26_1NSTEON:Scene, 6 pages.

(Continued)

*Primary Examiner* — Janese Duley
(74) *Attorney, Agent, or Firm* — Kilpatrick Townsend & Stockton LLP

(57) ABSTRACT

Multipurpose systems can include networked devices configured to include microphones, motion sensors, video cameras, touchscreens, optical sensors, speakers, or other suitable devices. The networked devices can include networking capabilities that enable the networked device to communicate with target devices and other networked devices. A system of networked devices can identify a target location or a target device by analyzing audio signals received at microphones of the networked devices. For example, a plurality of networked devices can identify a particular networked device that is in closest proximity to a user by analyzing an audio intensity of an audio signal received at the plurality of networked devices. The identified networked device can serve as a master device that can control a state of target devices.

10 Claims, 21 Drawing Sheets

Related U.S. Application Data which is a continuation-in-part of application No. 14/878,698, filed on Oct. 8, 2015, now Pat. No. 10,306,125, and a continuation-in-part of application No. 16/223,654, filed on Dec. 18, 2018, now Pat. No. 10,694,611, which is a continuation of application No. 15/852,958, filed on Dec. 22, 2017, now Pat. No. 10,194,512, which is a continuation-in-part of application No. 15/411,537, filed on Jan. 20, 2017, now Pat. No. 9,892,630, and a continuation-in-part of application No. 15/019,525, filed on Feb. 9, 2016, now Pat. No. 10,028,359, which is a continuation of application No. 14/750,786, filed on Jun. 25, 2015, now Pat. No. 9,713,231, said application No. 15/852,958 is a continuation-in-part of application No. 15/019,538, filed on Feb. 9, 2016, now Pat. No. 10,076,014, which is a continuation of application No. 14/750,786, filed on Jun. 25, 2015, now Pat. No. 9,713,231.

(60) Provisional application No. 62/061,871, filed on Oct. 9, 2014, provisional application No. 62/018,171, filed on Jun. 27, 2014, provisional application No. 62/020,852, filed on Jul. 3, 2014, provisional application No. 62/024,902, filed on Jul. 15, 2014, provisional application No. 62/087,743, filed on Dec. 4, 2014, provisional application No. 62/087,647, filed on Dec. 4, 2014.

(51) Int. Cl.
*G08C 17/02* (2006.01)
*H05B 47/105* (2020.01)

(52) U.S. Cl.
CPC ..... *G08C 2201/40* (2013.01); *G08C 2201/93* (2013.01)

(56) References Cited

U.S. PATENT DOCUMENTS

| | | | |
|---|---|---|---|
| 7,498,952 B2 | 3/2009 | Newman, Jr. | |
| 7,933,213 B1 | 4/2011 | Croak et al. | |
| 8,190,301 B2 | 5/2012 | Voysey | |
| 8,598,975 B2 | 12/2013 | Miura | |
| 8,598,978 B2 | 12/2013 | Knode | |
| 9,713,231 B2 | 7/2017 | Kelly et al. | |
| 9,892,630 B1 | 2/2018 | Strods | |
| 10,028,359 B2 | 7/2018 | Kelly et al. | |
| 10,076,014 B2 | 9/2018 | Kelly et al. | |
| 10,194,512 B2 | 1/2019 | Strods et al. | |
| 2003/0194912 A1 | 10/2003 | Ferentz | |
| 2006/0126617 A1 | 6/2006 | Cregg et al. | |
| 2007/0015416 A1 | 1/2007 | Gutierrez et al. | |
| 2008/0030588 A1* | 2/2008 | Boss | H04N 5/23203 348/211.2 |
| 2008/0248684 A1 | 10/2008 | Filipon et al. | |
| 2008/0259846 A1* | 10/2008 | Gonikberg | H04W 72/1215 370/328 |
| 2009/0013210 A1 | 1/2009 | McIntosh et al. | |
| 2009/0251352 A1 | 10/2009 | Altonen et al. | |
| 2010/0073856 A1 | 3/2010 | Huang et al. | |
| 2012/0044350 A1 | 2/2012 | Verfuerth | |
| 2012/0218211 A1 | 8/2012 | McRae et al. | |
| 2013/0184890 A1 | 7/2013 | Li et al. | |
| 2014/0032137 A1 | 1/2014 | Gogoana | |
| 2014/0035464 A1 | 2/2014 | Santos et al. | |
| 2014/0160304 A1* | 6/2014 | Galor | H04N 5/232 348/207.1 |
| 2014/0204804 A1 | 7/2014 | Lecourtier et al. | |
| 2014/0265881 A1 | 9/2014 | Karc et al. | |
| 2014/0321006 A1 | 10/2014 | Huang | |
| 2014/0340222 A1* | 11/2014 | Thornton | G08B 7/066 340/539.17 |
| 2015/0005900 A1 | 1/2015 | Steele et al. | |
| 2015/0189725 A1 | 7/2015 | Karc et al. | |
| 2015/0350612 A1* | 12/2015 | Brunson | H04N 7/183 348/143 |
| 2015/0382436 A1 | 12/2015 | Kelly et al. | |
| 2016/0066438 A1 | 3/2016 | Malek et al. | |
| 2016/0094616 A1 | 3/2016 | Pinkerton et al. | |
| 2016/0105644 A1* | 4/2016 | Smith | H04N 5/23206 348/159 |
| 2016/0174345 A1 | 6/2016 | Kelly et al. | |
| 2017/0013392 A1 | 1/2017 | Bora et al. | |
| 2018/0184152 A1 | 6/2018 | Kirkpatrick et al. | |

OTHER PUBLICATIONS

SkylinkHome SK-8 Wireless Remote 3-Way On/Off Kit, dated Jan. 11, 2012, retrieved from https://web.archive.org/web/20120111095210/http://www.smarthome.com/73027/SkylinkHome-SK-8-Wireless-Remote-3-Way-On-Off-KiT/p.aspx, 1 page.

Leviton Anywhere Decora RF Remote 3-way switch kit: Home Improvement, dated May 21, 2010, retrieved from https://web.archive.org/web/20100521112749/http://www.amazon.com/Leviton-6696-W-Anywhere-Switch-Remote/dp/B00004YUOL, 5 pages.

Carlon HW2172 Battery Powered Wireless Wall Switch and Plug-In On/Off Module, dated Oct. 26, 2010, retrieved from https://web.archive.org/web/20101026131700/http://www.smarthome.com/25330/Carlon-HW2172-Battery-Powered-Wireless-Wall-Switch-and-Plug-in-On-Off-Module-White/p.aspx, 3 pages.

Sierra Tools JB5571 Battery-Operated Ceiling/Wall Light with Remote—Vanity Lighting Fixtures, dated May 23, 2014, retrieved from https://web.archive.org/web/20140523063320/http://www.amazon.com/Sierra-Tools-JB5571-Battery-Operated-Ceiling/dp/BDD2MYIPKE, 5 pages.

INSTEON Wireless Switch, dated Apr. 14, 2013, retrieved from https://web.archive.org/web/20130414000334/http://www.insteon.com.2342-x42-mini-remote.html, 2 pages.

SkylinkHome WE-318 On/Off Wall Switch Receiver with Snap-On Remote, dated Oct. 13, 2014, retrieved from https://web.archive.org/web/20141013125648/http://www.amazon.com/SkylinkHome-WE-318-Receiver-Snap-On-Installation/dp/BDD52ROBZ6, 6 pages.

INSTEON: Remotelinc 2 INSTEON Remote Control Keypad, 4 Scene (#2444a2xx4) Owners Manual (Oct. 24, 2011) XP055208459, Retrieved from http://cache.insteon.com/pdf/2444a2wh4.pdf, 15 pages.

International Search Report and Written Opinion dated Aug. 25, 2015 in International Patent Application No. PCT/US2015/037777, 11 pages.

Notice of Allowance dated Apr. 3, 2017 in U.S. Appl. No. 14/750,786, 9 pages.

First Action Interview Pilot Program Pre-Interview Communication dated Sep. 23, 2016 in U.S. Appl. No. 14/750,786, 4 pages.

Non-Final Office Action dated Sep. 8, 2017 in U.S. Appl. No. 15/019,538, 12 pages.

Pre-Interview First Office Action dated Feb. 24, 2017 in U.S. Appl. No. 15/019,525, 6 pages.

Supplemental Notice of Allowance dated May 29, 2020 in U.S. Appl. No. 16/223,654, 3 pages.

\* cited by examiner

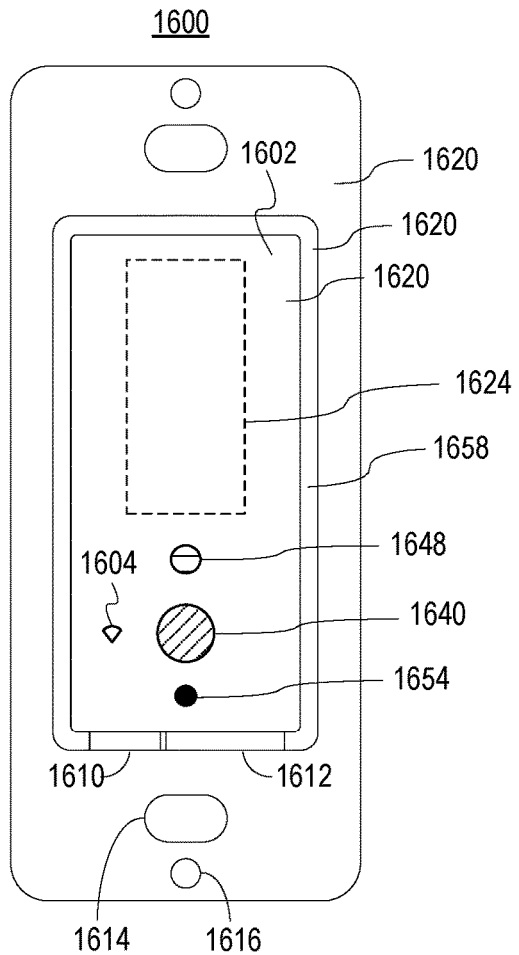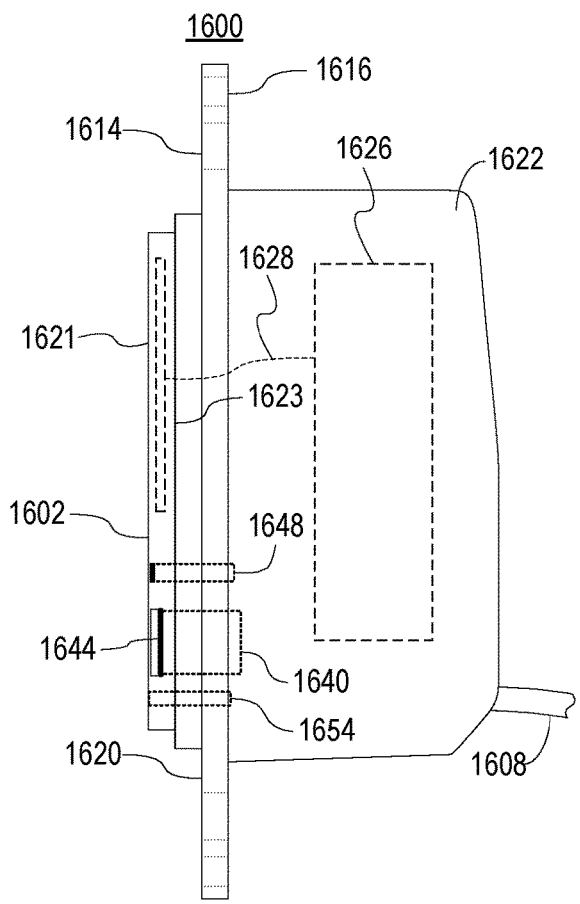
FIG. 16A
FIG. 16B

SYSTEMS AND METHODS FOR CONTEXTUAL INTELLIGENCE USING NETWORKED DEVICES

CROSS-REFERENCES TO RELATED APPLICATIONS

This application is a continuation-in-part of U.S. application Ser. No. 16/418,695, filed on May 21, 2019, which is a continuation-in-part of U.S. application Ser. No. 14/878, 698, filed Oct. 8, 2015 (now U.S. Pat. No. 10,306,125), which claims the benefit of and priority to U.S. Provisional Application No. 62/061,871, filed Oct. 9, 2014. U.S. application Ser. No. 16/418,695 is a continuation-in-part of U.S. application Ser. No. 16/223,654, filed on Dec. 18, 2018, which is a continuation of U.S. patent application Ser. No. 15/852,958, filed on Dec. 22, 2017 (now U.S. Pat. No. 10,194,512), which is a continuation-in-part of U.S. patent application Ser. No. 15/411,537, filed on Jan. 20, 2017 (now U.S. Pat. No. 9,892,630). U.S. patent application Ser. No. 15/852,958 is also a continuation-in-part of U.S. patent application Ser. No. 15/019,525 (now U.S. Pat. No. 10,028, 359) and U.S. patent application Ser. No. 15/019,538 (now U.S. Pat. No. 10,076,014), both filed on Feb. 9, 2016, and both continuations of U.S. patent application Ser. No. 14/750,786, filed on Jun. 25, 2015 (now U.S. Pat. No. 9,713,231). U.S. patent application Ser. No. 14/750,786, filed on Jun. 25, 2015 (now U.S. Pat. No. 9,713,231), claims the benefit of and priority to U.S. Provisional Application No. 62/018,171, filed on Jun. 27, 2014, U.S. Provisional Application No. 62/020,852, filed on Jul. 3, 2014, U.S. Provisional Application No. 62/024,902, filed on Jul. 15, 2014, U.S. Provisional Application No. 62/087,647, filed on Dec. 4, 2014, and U.S. Provisional Application No. 62/087, 743, filed on Dec. 4, 2014. All of these applications are hereby incorporated by reference in their entireties for all purposes.

TECHNICAL FIELD

The present disclosure relates generally to systems and methods for contextual intelligence. More specifically, the disclosure relates to systems and methods for contextually identifying target locations and target devices using networked devices

BACKGROUND

Traditionally, switches for controlling fixtures (e.g., light bulbs or fans) are located in every room of a building (e.g., near doorways or windows). The switches have a single purpose (e.g., turning on and off a light). Accordingly, the switches do not have capabilities that serve multiple purposes.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a system, including one or more data processors and a non-transitory computer-readable storage medium containing instructions which, when executed on the one or more data processors, cause the one or more data processors to perform operations. The operations can include receiving real-time audio data, identifying a parameter of the real-time audio data, and broadcasting the parameter. For example, the parameter can identify a characteristic of the real-time audio data. Further, broadcasting can facilitate communication between a plurality of additional networked devices. The operations can include dynamically identifying a master device from among the networked device and the plurality of additional networked devices, and identifying a target device associated with the master device.

Embodiments of the present disclosure additionally include a computer-implemented method. The computer-implemented method can include receiving real-time audio data, identifying a parameter of the real-time audio data, and broadcasting the parameter. For example, the parameter can identify a characteristic of the real-time audio data. Further, broadcasting can facilitate communication between a plurality of additional networked devices. The computer-implemented method can include dynamically identifying a master device from among the networked device and the plurality of additional networked devices, and identifying a target device associated with the master device.

Embodiments of the present disclosure additionally include a computer-program product tangibly embodied in a non-transitory machine-readable storage medium, including instructions configured to cause a data processing apparatus to perform operations. The operations can include receiving real-time audio data, identifying a parameter of the real-time audio data, and broadcasting the parameter. For example, the parameter can identify a characteristic of the real-time audio data. Further, broadcasting can facilitate communication between a plurality of additional networked devices. The operations can include dynamically identifying a master device from among the networked device and the plurality of additional networked devices, and identifying a target device associated with the master device.

BRIEF DESCRIPTION OF THE DRAWINGS

The specification makes reference to the following appended figures, in which use of like reference numerals in different figures is intended to illustrate like or analogous components.

FIG. 16A is an illustration of an example of a front view of a networked device, in accordance with an embodiment of the invention.

FIG. 16B is an illustration of an example of a side view of a networked device, in accordance with an embodiment of the invention.

Figure 1:
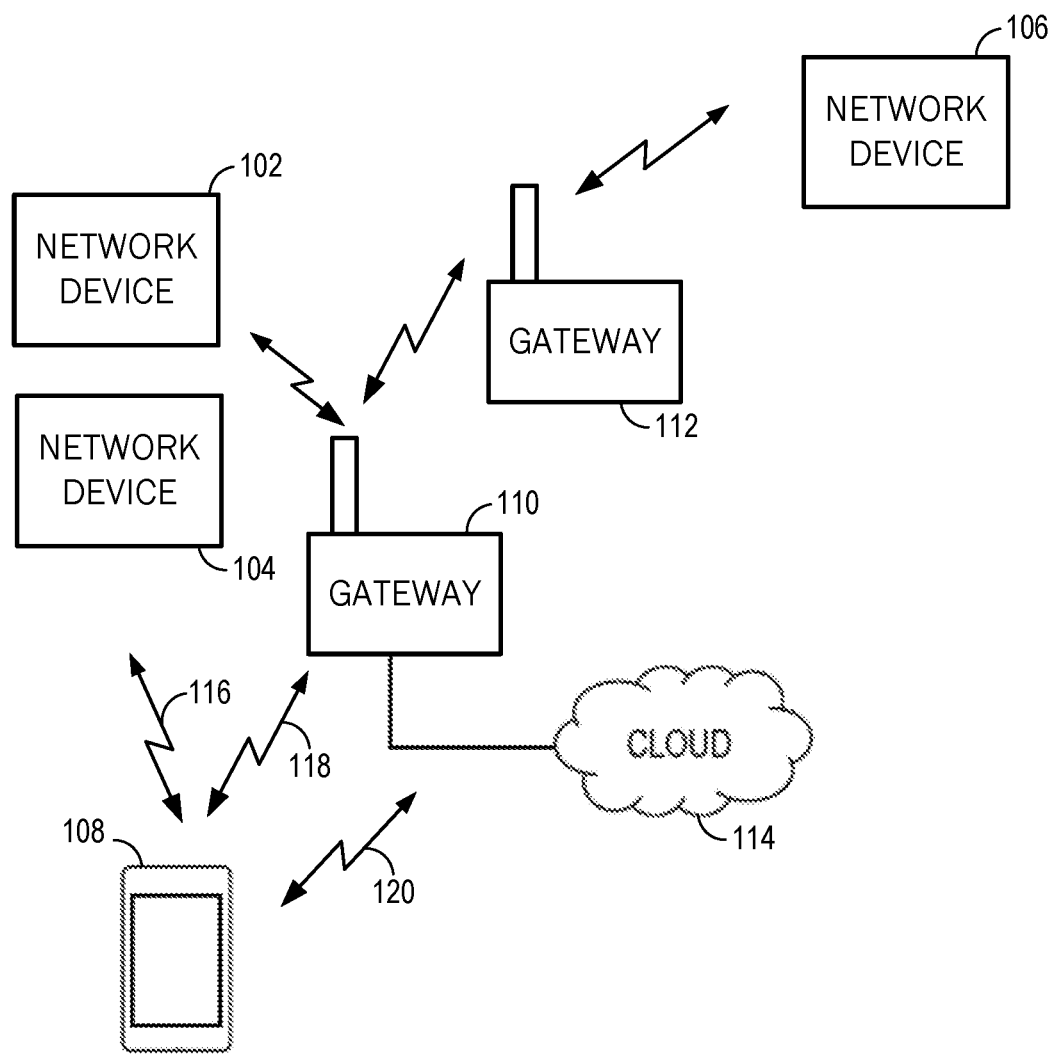
FIG. 1 is an illustration of an example of a network environment, in accordance with some embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Certain aspects and features of the present disclosure relate to multipurpose systems, for example, networked devices configured to include microphones, motion sensors, video cameras, touchscreens, optical sensors, speakers, or other suitable components. Examples of networked devices can include light switches, switches for controlling fixtures (e.g., light fixtures, fans, and the like), power outlets, smoke detectors, or other suitable devices that can be in communication with other devices using a network. The networked devices can include networking capabilities to enable the networked device to communicate with target devices and other networked devices.

In addition, certain aspects and features of the present disclosure relate to a system of networked devices that can communicate with each other to identify a target location or a target device. The system can analyze audio signals received using microphones of the networked devices. In some cases, a plurality of networked devices can identify a particular networked device that is in closest proximity to a user by calculating an audio intensity of an audio signal received at the plurality of networked devices. The identified networked device can serve as a master device that can control a state of target devices.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network. As explained herein, techniques are provided that allow generation of a single logical network in a local area network, thus preventing multiple logical networks from being associated with the local area network. These techniques allow a user, whether located locally or remotely from the local area network, to access all network devices in the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

Accordingly, techniques and systems are described herein for identifying a primary gateway and generating a logical network using credentials of the primary gateway. Accordingly, a single logical network may be generated for a local area network. Whether located locally or remotely, a user may thus access all network devices in the local area network using the single logical network.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, an infrared (IR) transceiver, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. In some embodiments, the network devices 102, 104, 106 may connect directly to the cloud network 114, for example, using broadband network access such as a cellular network. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
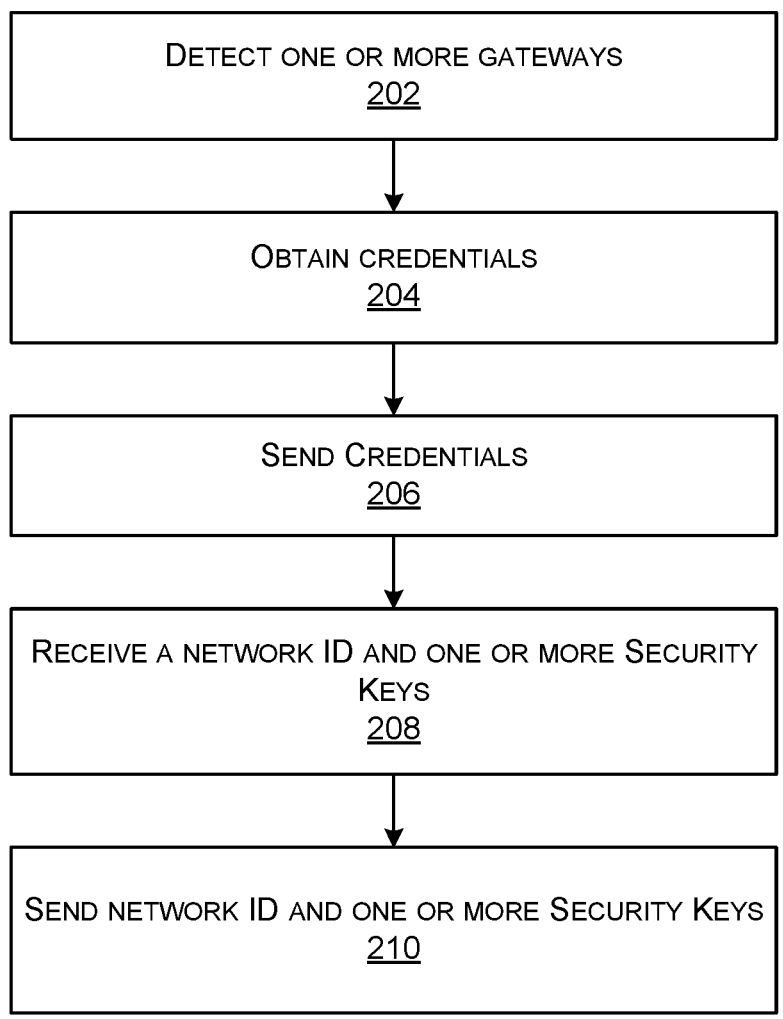
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the-network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the-network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each-network device, or individual storage tables for each local area network or other subset of its network devices/networks. In one embodiment, a change in status may prompt the-network device to push its change in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the-network devices on the network 100. In other embodiments, one-network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if-network devices 102 and 104 were to each turn on and communicate their statuses to cloud network 114, cloud network 114 may analyze the status of network devices 102 and 104 and communicate to-network devices 102 and 104 that they are each connected to the same local area network 100.

Figure 3:
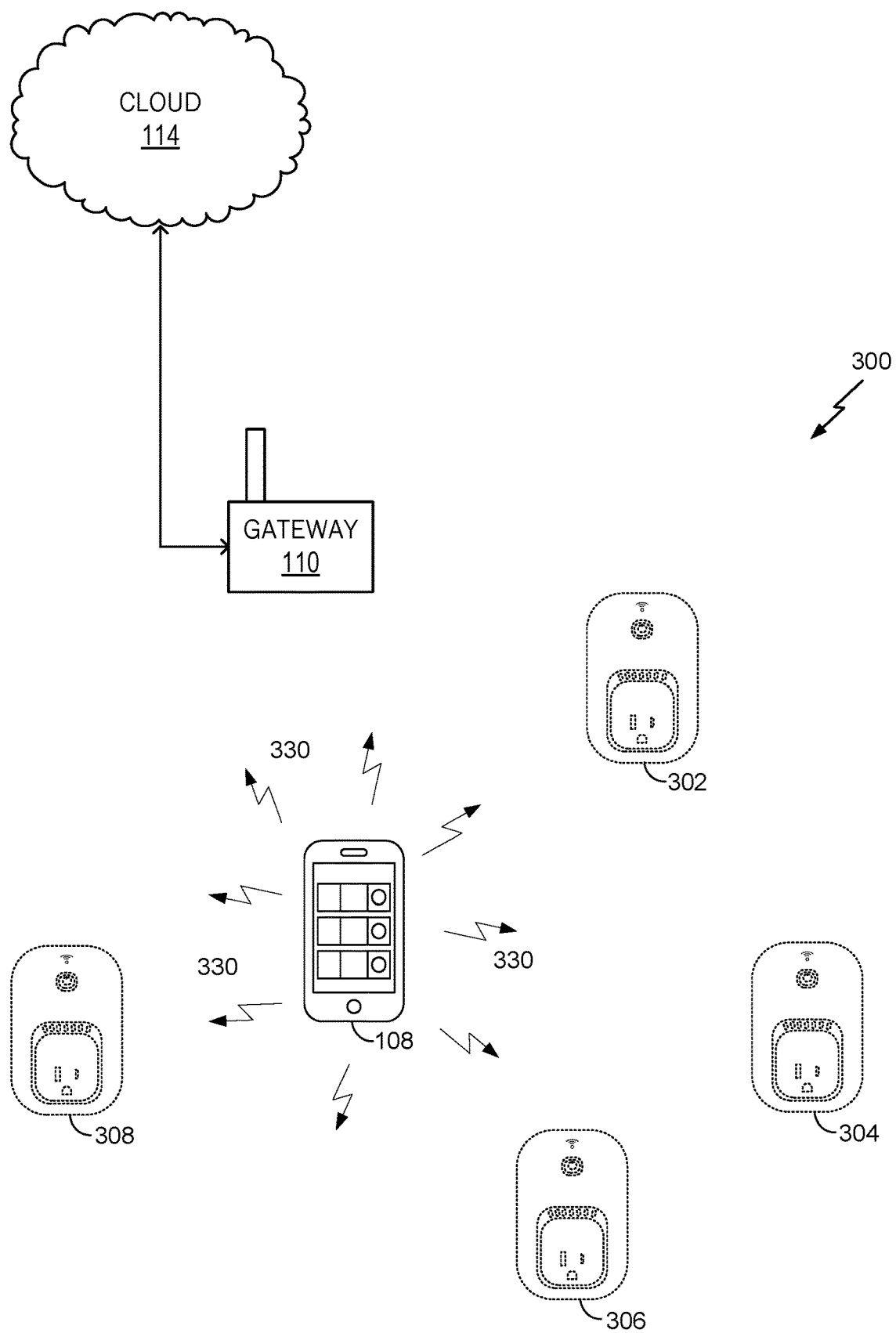
FIG. 3 is an illustration of an example of a network environment, in accordance with some embodiments.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
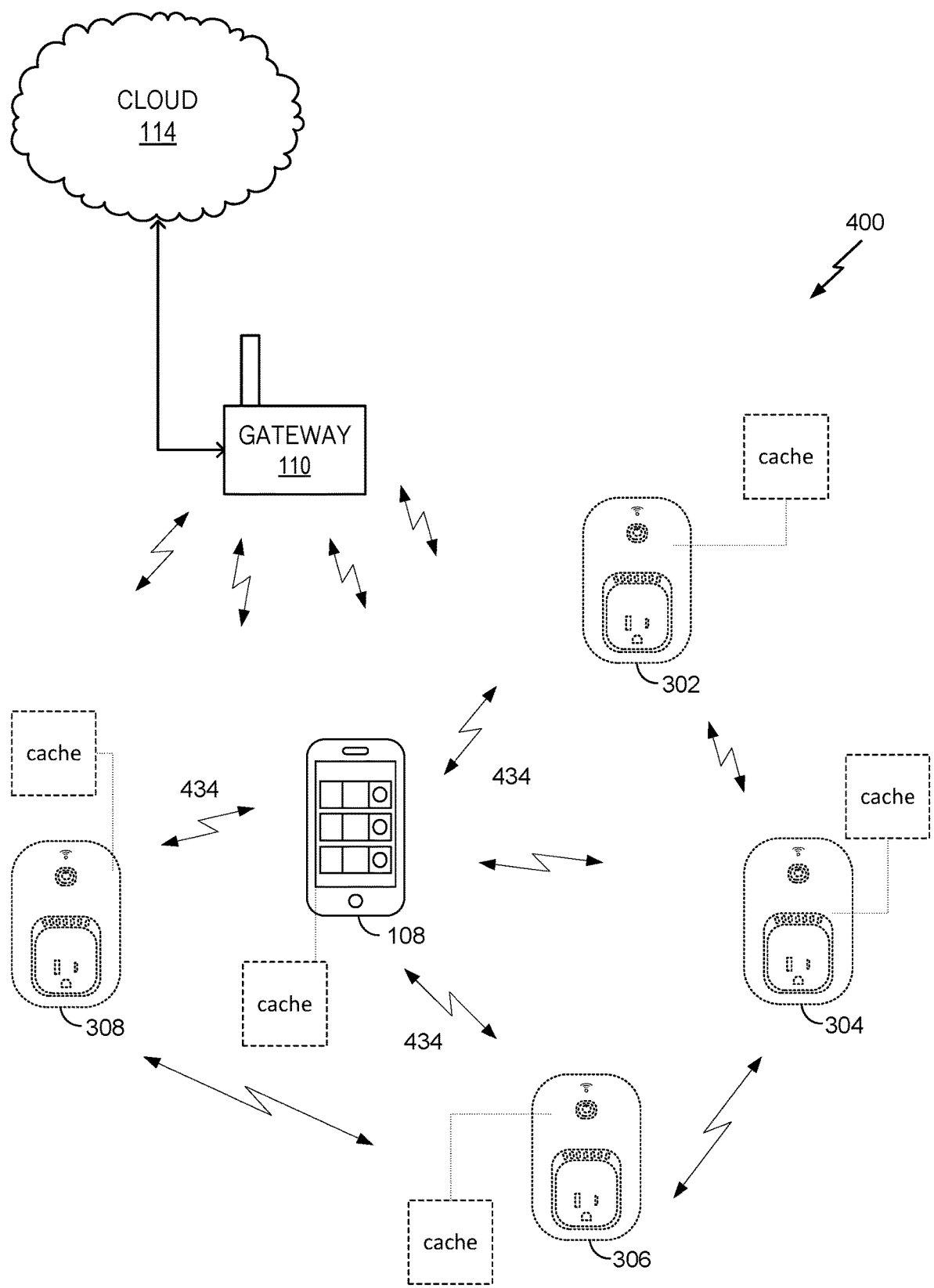
FIG. 4 is an illustration of an example of a network environment, in accordance with some embodiments.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network devices 302-308 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/ powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/ updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
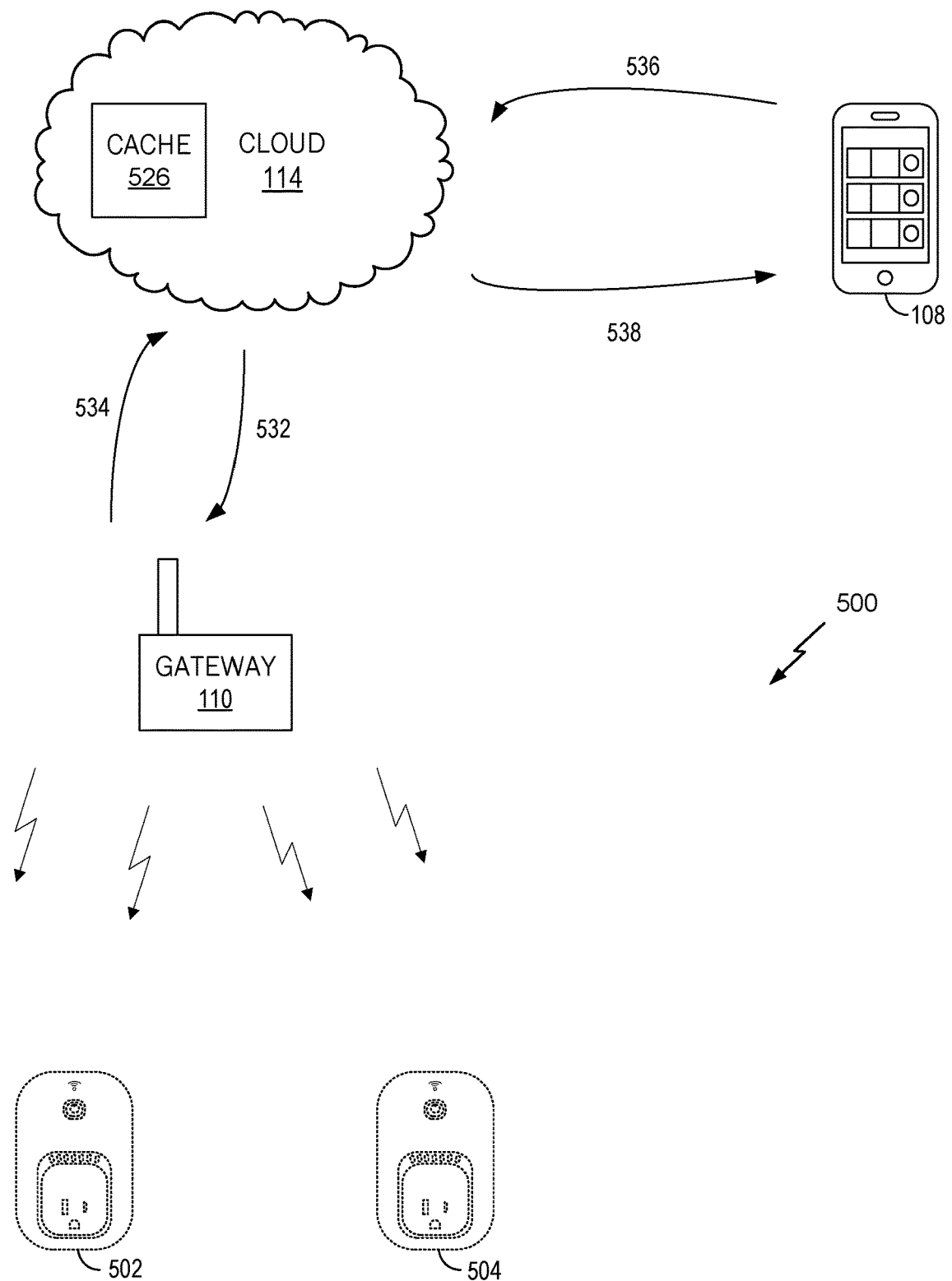
FIG. 5 is an illustration of an example of a network environment, in accordance with some embodiments.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud 114, the internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud 114 to replace the previously stored/cached statuses in cache 526. Upon receipt of updated status data 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Figure 6:
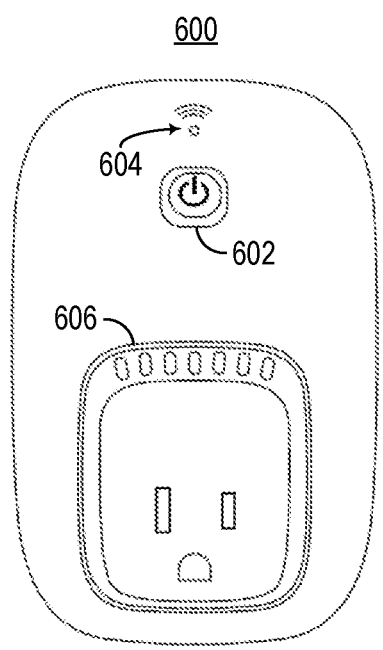
FIG. 6 is an illustration of an example of a front view of a network device, in accordance with an embodiment.
Figure 7:
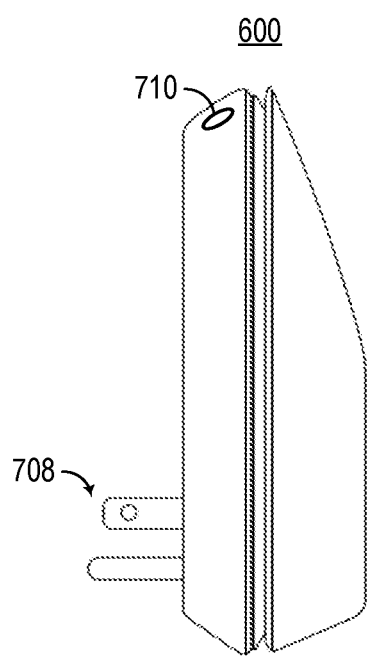
FIG. 7 is an illustration of an example of a side view of a network device, in accordance with an embodiment.

FIG. 6 illustrates an example of a front view of a network device 600. FIG. 7 illustrates an example of a side view of the network device 600. The network device 600 may include any of the network devices 102, 104, or 106 described herein. In some embodiments, the network device 600 may be a home automation network device. For example, the network device 600 may include a home automation switch that may be coupled with a home appliance. A user may wirelessly access the network device 600 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 600 may include a WiFi enabled switch that connects home appliances and other electronic devices to a compatible 802.11b/g/n/ac WiFi network. The network device 600 may thus allow users to locally or remotely turn devices on or off from anywhere, program customized notifications, and/or change device status. The network device 600 may further allow a user to create custom schedules or have devices respond to sunrise or sunset.

The network device 600 includes an power switch 602 that may be depressed in order to turn the network device 600 on and off. In some embodiments, a light source may be integrated with or located behind the power switch. For example, a light-emitting diode (LED) may be located on a circuit board under the power button 602. The light source may be illuminated when the network device 600 is powered on, and may not be illuminated when the network device 600 is powered off.

The network device 600 further includes a communications signal indicator 604. The signal indicator 604 may indicate whether the network device 600 has access to a communications signal, such as a WiFi signal. For example, the signal indicator 604 may include a light source (e.g., a LED) that illuminates when the network device 600 is connected to a communications signal. The light source may depict different colors or other characteristics (e.g., flashing, dimming, or the like) to indicate different levels of signal strength or mode of operation.

The network device 600 includes a restore button 710. The restore button 710 may allow a user to reset the network device 600 to factory default settings. For example, upon being depressed, the restore button 710 may cause all software on the device to be reset to the settings that the network device 600 included when purchased from the manufacturer.

The network device 600 further includes a plug 708 and an outlet 606. The plug 708 allows the network device 600 to be plugged into a wall socket, such as a socket providing 120V, 220V, or the like. In turn, an appliance may be plugged into the outlet 606. Once the network device 600 is registered according to the techniques described above, an appliance plugged into the socket 606 may be controlled by a user using an access device (e.g., access device 108).

Figure 8:
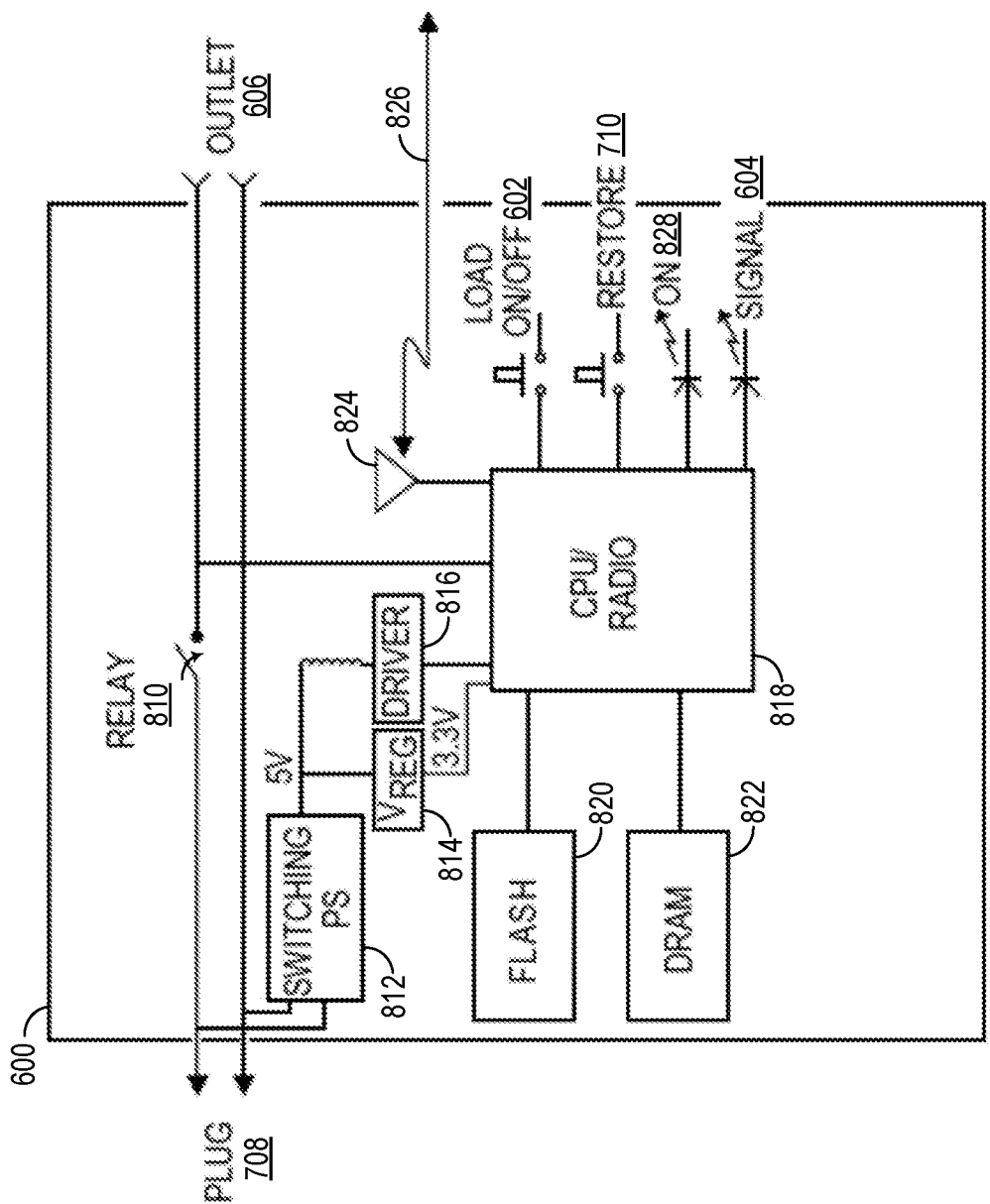
FIG. 8 is an example of a block diagram of a network device, in accordance with an embodiment.

FIG. 8 is an example of a block diagram of the network device 600 depicting different hardware and/or software components of the network device 600. As described above with respect to FIGS. 6 and 7, the network device 600 includes the outlet 606, the plug 708, the power button 602, the restore button 710, and the communications signal indicator 604. The network device 600 also includes light source 828 associated with the power button 602. As previously described, the light source 828 may be illuminated when the network device 600 is powered on.

The network device 600 further includes a relay 810. The relay 810 is a switch that controls whether power is relayed from the plug 708 to the outlet 606. The relay 810 may be controlled either manually using the power button 602 or remotely using wireless communication signals. For example, when the power button 602 is in an ON position, the relay 810 may be closed so that power is relayed from the plug 708 to the outlet 606. When the power button 602 is in an OFF position, the relay 810 may be opened so that current is unable to flow from the plug 708 to the outlet 606. As another example, an application or program running on an access device may transmit a signal that causes the relay 810 to be opened or closed. For instance, an access application may display a graphical interface on the access device that includes a power button. The user may tap or otherwise select the power button, and the access application may send a communication signal (e.g., over a WiFi network) to the network device 600 instructing the network device 600 to open or close the relay 810.

The network device 600 further includes flash memory 820 and dynamic random access memory (DRAM) 822. The flash memory 820 may be used to store instructions or code relating to an operating system, one or more applications, and any firmware. The flash memory 820 may include nonvolatile memory so that any firmware or other program can be can updated. In the event the network device 600 loses power, information stored in the flash memory 820 may be retained. The DRAM 822 may store various other types of information needed to run the network device 600, such as all runtime instructions or code.

The network device 600 further includes a CPU/Radio 818. The CPU/Radio 818 controls the operations of the network device 600. For example, the CPU/Radio 818 may execute various applications or programs stored in the flash memory 820 and/or the dynamic random access memory (DRAM) 822. The CPU/Radio 818 may also receive input from the various hardware and software components, interpret the input, and perform one or more functions in response to the input. As one example, the CPU/Radio 818 may determine whether the power button 602 has been pressed, and determines whether the relay 810 needs to be opened or closed. The CPU/Radio 818 may further perform all communications functions in order to allow the network device 600 to communicate with other network devices, one or more gateways, a cloud network, and/or one or more access devices. While the CPU and radio of the network device 600 are shown to be combined in the CPU/Radio 818, one of ordinary skill in the art will appreciate that, in some embodiments, the CPU and radio may be separately located within the network device 600. For example, CPU circuitry may be situated at a separate location on a circuit board from the location of radio circuitry, the CPU circuitry may be located on a different circuit board from the radio circuitry, or the like. Further, the network device 600 may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 600 does not include a cellular network transceiver radio or interface, and thus may not be configured to directly communicate with a cellular network. In some embodiments, the network device 600 may include a cellular network transceiver radio, and may be configured to communicate with a cellular network using the cellular network transceiver radio.

The network device 600 may communicate with other devices and/or networks via antenna 824. For example, antenna 824 may include a 2.4 GHz antenna, a 5 GHz antenna, or the like, that can transmit and receive WiFi communications signals. The network device 600 may include other types of antennas that can communicate Bluetooth® signals, Zigbee® signals, Ultra-Wideband (UWB) signals, WiFi-Direct signals, BLE signals, and/or the like. In some embodiments, the antenna 824 may be configured to communicate different types of signals, such as the WiFi signals, Bluetooth® signals, Zigbee® signals, UWB signals, WiFi-Direct signals, BLE signals, and/or the like. In some embodiments, the network device 600 may include multiple antennas for communicating the different types of communication signals. As one example, the network device 600 may include both a 2.4 GHz antenna and a 5 GHz antenna.

The network device 600 further includes a driver 816, a switching power supply 812, and a voltage regulator 814. The driver 816 may include instructions or code that can be used to translate control signals or commands received from applications running on the DRAM 822 to commands that the various hardware components in the network device 600 can understand. In some embodiments, the driver 816 may include an ambient application running on the DRAM 822. The switching power supply 812 may be used to transfer power from the outlet in which the plug 708 is connected to the various loads of the network device 600 (e.g., CPU/Radio 818). The switching power supply 812 may efficiently convert the voltage and current characteristics of the electrical power to a level that is appropriate for the components of the network device 600. For example, the switching power supply 812 may perform AC-DC conversion. In some embodiments, the switching power supply 812 may be used to control the power that is relayed from the plug 708 to the outlet 606. The voltage regulator 814 may be used to convert the voltage output from the switching power supply 812 to a lower voltage usable by the CPU/Radio 818. For example, the voltage regulator 814 may regulate the DC voltage from 5V to 3.3V.

In various embodiments, functions may be stored as one or more computer-program products, such as instructions or code, in a non-transitory machine-readable storage medium, such as the flash memory 820 and/or the DRAM 822. The network device 600 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a computer (or other device) to perform one or more operations in accordance with the described methods. Such functions or code may include code to perform the steps described above with respect to FIG. 2. The memory, such as the flash memory 820 and/or the DRAM 822, may be a processor-readable memory and/or a computer-readable memory that stores software code (programming code, instructions, etc.) configured to cause a processor(s) within the CPU/Radio 818 to perform the functions described. In other embodiments, one or more of the functions described may be performed in hardware.

A set of these instructions and/or code might be stored on a non-transitory machine-readable storage medium, such as the flash memory 820 and/or the DRAM 822. In some cases, the storage medium might be incorporated within a computer system, such as the CPU/Radio 818. In other embodiments, the storage medium might be separate from a computer system (e.g., a removable medium, such as a compact disc), and/or provided in an installation package, such that the storage medium can be used to program, configure and/or adapt a computer with the instructions/code stored thereon. These instructions might take the form of executable code, which is executable by the network device 600 and/or might take the form of source and/or installable code, which, upon compilation and/or installation on the network device 600 (e.g., using compilers, installation programs, compression/decompression utilities, etc.) then takes the form of executable code.

It should be appreciated that the network device 600 may have other components than those depicted in FIGS. 6-8. Further, the embodiment shown in the figures are only one example of a network device that may incorporate an embodiment of the invention. In some other embodiments, network device 600 may have more or fewer components than shown in the figure, may combine two or more components, or may have a different configuration or arrangement of components.

Figure 9:
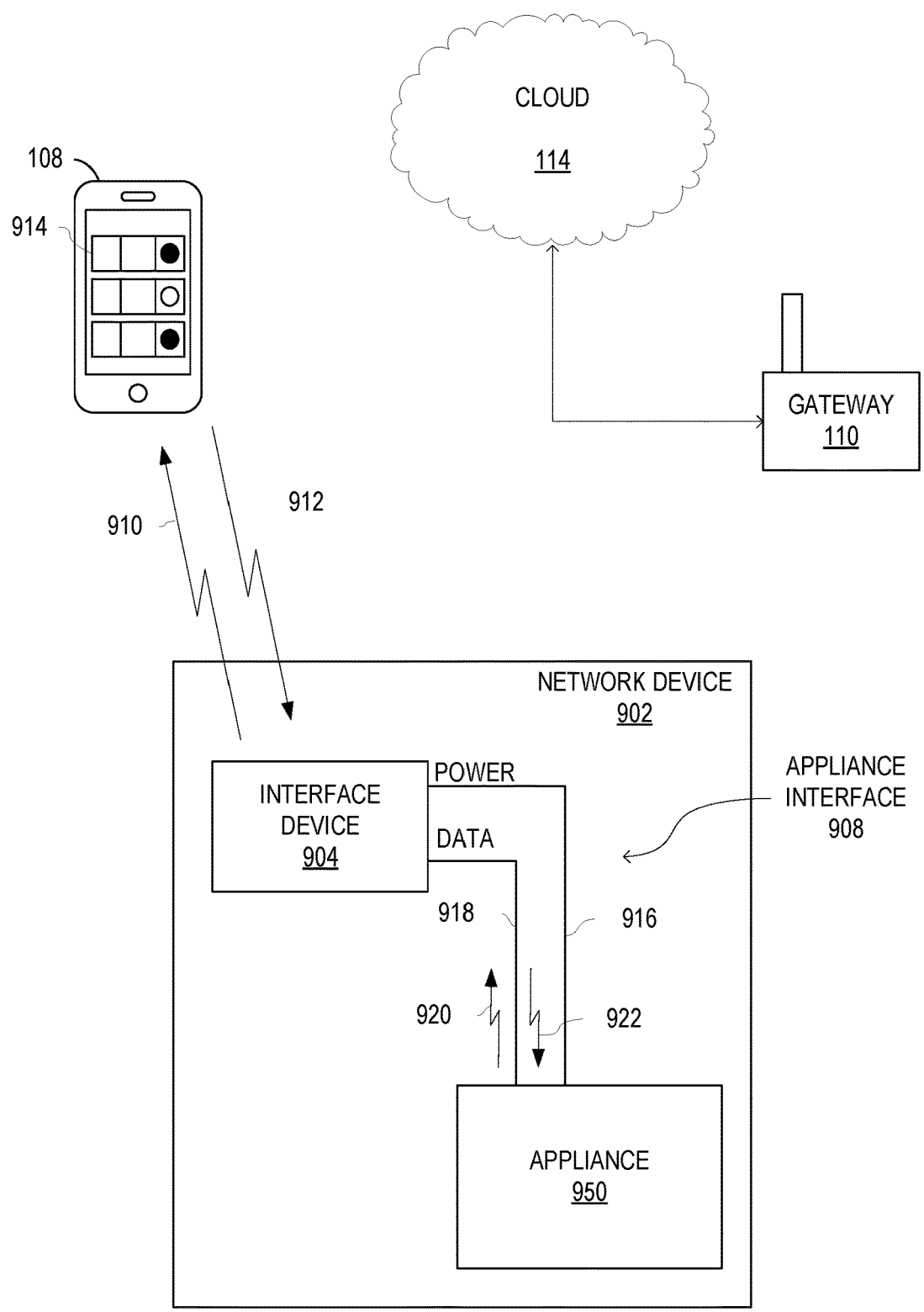
FIG. 9 is a schematic illustration of a local area network including a network device that includes an appliance, in accordance with an embodiment.

FIG. 9 is a schematic illustration of a local area network 900 including a network device 902 that includes an appliance 950. The network device 902 can comprise an interface device 904 and the appliance 950 connected by an appliance interface 908. The appliance interface 908 can include a data connection 918 and a power connection 916. The data connection 918 can be a serial connection (e.g., RS-232, USB, or other), or any other suitable data connection. The interface device 904 can be fully powered by the appliance 902 through the power connection 916, or can have a separate source of power.

The appliance 950 can be any suitable electric device, such as a crock pot, space heater, an iron, a washing machine, a dishwasher, a lamp, a radio, a computer, an amplifier, or another electrical device. Additional examples of suitable electrical devices include electrical devices incorporated into or with non-electrical devices, such as an actuator system in an electrically-actuated deadbolt, a sensing system in a seat cushion, or other suitable electrical device incorporated into or with a non-electrical device. The appliance 950 can be adapted to operate with the interface device 904. The appliance 950 can be any finite state machine. The appliance 950 can, but need not, know or store one or more states related to the appliance. For example, the appliance 950 may know or store data related to whether the appliance 950 is turned on, how long the appliance has been on (or off), among other status data.

The interface device 904 can be positioned within the housing of the appliance 950, or can be attached externally to the appliance 950. The interface device 904 can be removable from the appliance 950, or can be permanently installed in or on the appliance 950.

The interface device 904 can be connected to the local area network 900 through a network interface. The interface device 904 can be connected by a wired or wireless connection (e.g., WiFi, Zigbee, or others described herein or well known). In some embodiments, the interface device 904 can be connected directly to the cloud network 114 through a cellular internet connection (e.g., EDGE, LTE, or others).

The interface device 904 can communicate with another network device, an access device 108, or another client device through the network interface 906. The interface device 904 can transmit a status information signal 910 with status information to the access device 108, and the access device 108 can transmit a network device control signal 912 to the interface device 904. The status information signal 910 and the network device control signal 912 can be transmitted between the interface device 904 and the access device 108 using a telecommunications network (e.g., a cellular network, or other suitable broadband network), using a local area network 900 (e.g., through a gateway 110), or using the cloud network 114, although such a signal may pass through an intermediary device or network to do so.

The interface device 904 can interpret the network device control signal 912 and perform actions based on the contents of the network device control signal 912. The network device control signal 912 can include commands that can be performed by the interface device 904 itself. The network device control signal 912 can also include commands that are to be performed by the appliance 950. Commands that are to be performed by the appliance 950 can include commands like turn on or off, set a desired temperature (e.g., heat up or cool down to 215° F. or any other temperature), or other suitable commands depending on the particular appliance. The interface device 904 can interpret the network device control signal 912 and can send out a command 922, through the data connection 918 of the appliance interface 908, based on the network device control signal 912. The appliance 950 can then perform the command indicated in the network device control signal 912.

The interface device 904 can also transmit commands to the appliance 950 that are not based on a network device control signal received from the access device 108, but are rather based on programming in the interface device 904. Examples of such commands can include commands to update a communication rate, commands to check a state of the appliance 950, commands to set or get a clock time of the appliance 950, or any other suitable commands.

The interface device 904 can receive, through the data connection 918 of the appliance interface 908, a response (e.g., response 920) to any command from the appliance 950. In some examples, the response 920 can include an indication that the command 922 was received. In some examples, the response may include only an indication that a command is received (e.g., an ACK). In some examples, the response 920 can include information for some value on the appliance 950, such as an "on/off" state, a serial number, a product identification, a manufacturer identification, a temperature, a time since live, a setting, or any other value retrievable from the appliance 950. The interface device 904 can interpret the value and can send information about the value (e.g., the state of the appliance is "on," the temperature of the appliance, the time since the appliance first turned on, or other information) as status information (e.g. using status information signal 910) to the access device 108. Additionally, the interface device 904 can send status information about itself (e.g., time since live, supplied power, signal strength, and others) as status information (e.g. using status information signal 910) to the access device 108.

The interface device 904 can also use responses (e.g., response 920) from the appliance 950 to perform additional functions at the interface device 904, such as error handling. In some cases, when performing the additional functions, the interface device 904 does not transmit any status information 910 to the access device 108 based on those particular responses.

The access device 108 can include one or more display tiles (e.g., display tile 914) for displaying information and controls corresponding to the network device 102.

In some embodiments, the interface device 904 can transmit a heartbeat command (e.g., command 922) over the data connection 918 to the appliance 902 to determine whether the appliance 950 is working properly and/or in a state of readiness. If the interface device 904 determines that the appliance 950 has had some sort of failure (e.g., the appliance 950 sends a response 920 indicating a failure or the interface device 904 does not receive any response 920), the interface device 904 can take corrective action (e.g., restarting the appliance 950 or an element of the appliance 950), can log the event, or can alert the user).

Figure 10:
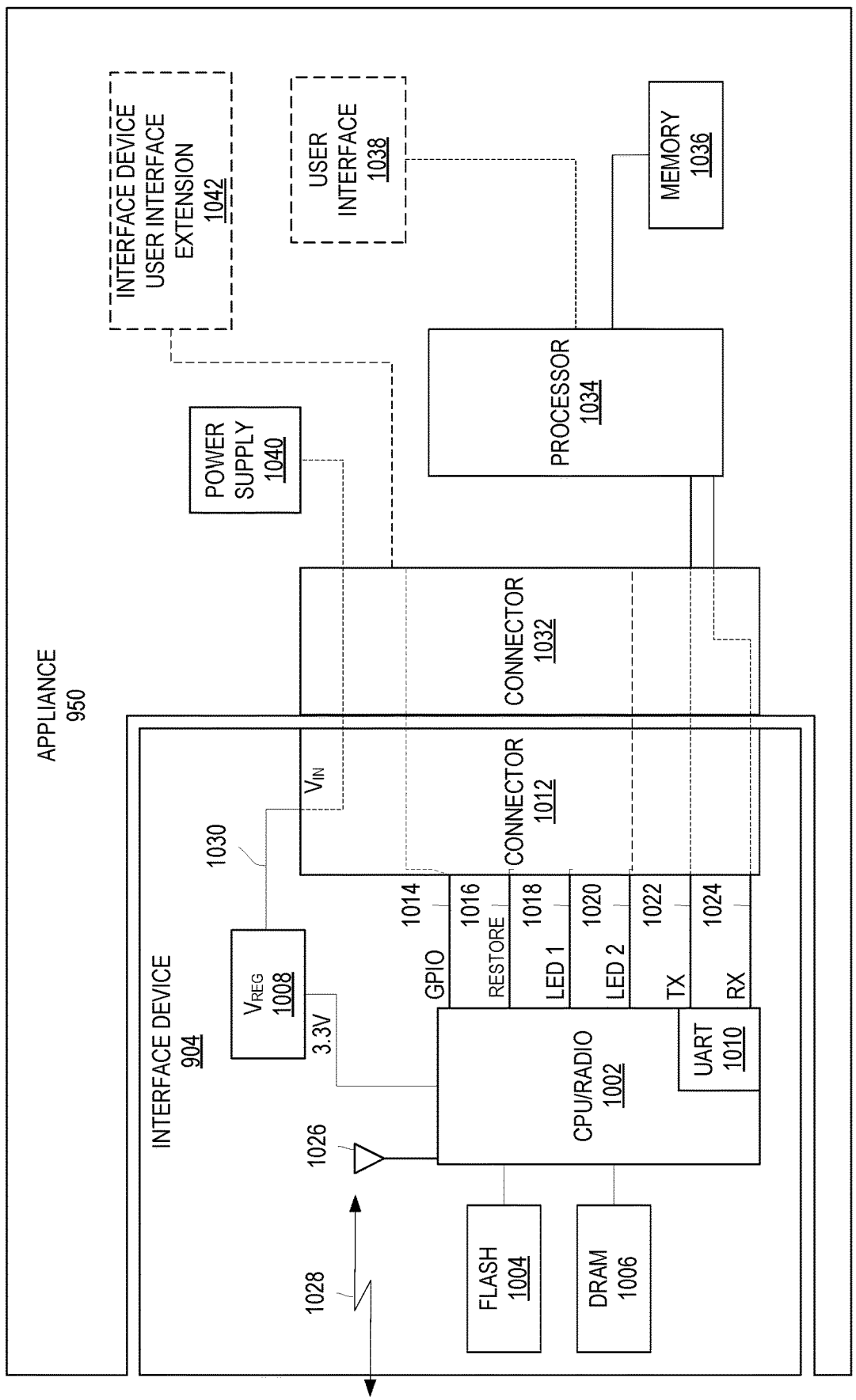
FIG. 10 is an example of a block diagram of a network device including an interface device attached to an appliance, in accordance with an embodiment.

FIG. 10 depicts a block diagram of a network device including an interface device 904 attached to an appliance 950 according to one embodiment. The interface device 904 can include connector 1012 that interacts with connector 1032 of the appliance 950.

The interface device 904 can include flash memory 1004 and dynamic random access memory (DRAM) 1006. The flash memory 1004 may be used to store instructions or code relating to an operating system, one or more applications, and any firmware. The flash memory 1004 can be used to store a cache. The flash memory 1004 may include non-volatile memory so that any firmware or other program can be can updated. In the event the interface device 904 loses power, information stored in the flash memory 1004 may be retained. The DRAM 1006 may store various other types of information needed to run the interface device 904, such as all runtime instructions or code. The flash memory 1004 or DRAM 1006 or a combination thereof may include all instructions necessary to communicate with an appliance 950, including all instructions necessary to communicate using the appliance serial protocol disclosed herein.

The interface device 904 further includes a CPU/Radio 1002. The CPU/Radio 1002 can control the operations of the interface device 904. For example, the CPU/Radio 1002 may execute various applications or programs stored in the flash memory 1004 and/or the dynamic random access memory (DRAM) 1006. The CPU/Radio 1002 may also receive input from the appliance 950, interpret the input, and perform one or more functions in response to the input. The CPU/Radio 1002 may further perform all communications functions in order to allow the interface device 904 to communicate with other network devices, one or more gateways, a cloud network, and/or one or more access devices. The interface device 904 may communicate with other devices and/or networks via antenna 1026. For example, antenna 1026 may include a 2.4 GHz antenna that can transmit and receive WiFi communications signals 1028. The antenna 1026 may include other types of antennas that can communicate Bluetooth® signals, Zigbee® signals, Ultra-Wideband (UWB) signals, and/or the like. In some embodiments, the interface device 904 may include multiple antennas for communicating different types of communication signals.

The CPU/Radio 1002 can include at least one universal asynchronous receiver/transmitter (UART) 1010. The CPU/Radio 903 can use the UART 1010 to send and receive serial communications. The CPU/Radio 903 can send data through a transmit line 1022 and a receive data through a receive line 1024. The CPU/Radio 903 can send and receive data through the transmit line 1022 and receive line 1024 using a serial protocol, such as RS232. The CPU/Radio 1002 can also include an input/output (GPIO) line 1014, a restore line 1016, an LED 1 line 1018, and an LED 2 line 1020. The CPU/Radio 1002 can have additional or fewer lines as necessary. The GPIO line 1014 can be used for any suitable function, such as powering an indicator light on an appliance 950 or accepting an input from the appliance 950. A signal sent on the restore line 1016 can be used to restore the CPU/Radio 1002 and/or the interface device 904 to factory defaults. The LED 1 line 1018 and LED 2 line 1020 can be used to power first and second LEDs that can be used to indicate various statuses, such as whether the interface device has a network connection and whether the interface device is powered on.

The interface device 904 further includes a voltage regulator 1008. The voltage regulator 1008 may be used to convert the voltage output from the appliance 950 to a voltage usable by the CPU/Radio 1002. For example, the voltage regulator 1008 may regulate the DC voltage from 5V to 3.3V. The voltage regulator 1008 can be supplied with power from a power line 1030.

Each of the interface lines, including the GPIO line 1014, the restore line 1016, the LED 1 line 1018, the LED 2 line 1020, the transmit line 1022, the receive line 1024, the power line 1030, and any additional lines, can be routed through connector 1012. Connector 1012 can be a proprietary or universal connector. Any appliance 950 to which the interface device 904 is attached through the connector 1012 can have the necessary hardware to make use of the interface lines, such as to provide power to the power line 1030 and to provide the first and second LEDs that are driven by the LED 1 line 1018 and LED 2 line 1020.

In alternate embodiments, some interface lines are not routed through the connector 1012. For example, the power line 1030 can be routed to a power supply attached directly to the interface device 904, and the LED 1 line 1018 and LED 2 line 1020 can be routed to first and second LEDs located within the interface device 904.

In various embodiments, functions may be stored as one or more instructions or code in memory, such as the flash memory 1004 and/or the DRAM 1006. The interface device 904 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed below may be implemented as code and/or instructions executable by a computer (and/or a processor within a computer); in an aspect, then, such code and/or instructions can be used to configure and/or adapt a device (e.g. a specialty computer) to perform one or more operations in accordance with the described methods. Such functions or code may include code to perform various steps described below. The memory, such as the flash memory 1004 and/or the DRAM 1006, may be a processor-readable memory and/or a computer-readable memory that stores software code (programming code, instructions, etc.) configured to cause a processor(s) within the CPU/Radio 1002 to perform the functions described. In other embodiments, one or more of the functions described may be performed in hardware.

A set of these instructions and/or code might be stored on a computer-readable storage medium, such as the flash memory 1004 and/or the DRAM 1006. In some cases, the storage medium might be incorporated within a computer system, such as the CPU/Radio 1002. In other embodiments, the storage medium might be separate from a computer system (e.g., a removable medium, such as a compact disc), and/or provided in an installation package, such that the storage medium can be used to program, configure and/or adapt a device (e.g. a computer) with the instructions/code stored thereon. These instructions might take the form of executable code, which is executable by the interface device 904 and/or might take the form of source and/or installable code, which, upon compilation and/or installation on the interface device 904 (e.g., using any of a variety of compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

The interface device 904 may have other components than those depicted in FIG. 10. Further, the embodiment shown in the figures are only one example of an interface device that may incorporate an embodiment of the invention. In some other embodiments, interface device 904 may have more or fewer components than shown in the figure, may combine two or more components, or may have a different configuration or arrangement of components.

The appliance 950 can have a processor 1034. The processor 1034 can be a microcontroller, such as a Peripheral Interface Controller (PIC). The appliance 950 can include a memory 1036 (e.g., a flash memory or other) that is readable by the processor 1034. The memory 1036 can include instructions enabling the innate functionality of the appliance 950, such as heating and timing for a crock pot.

The appliance 950 can include a user interface 1038. The user interface 1038 can provide buttons, displays, LEDs, knobs, and other input and output elements necessary for a user to interact with the appliance 950. For example, a user interface 1038 for a slow cooker can include a display, a power button, a temperature adjustment button, and a start button. The user interface 1038 can be driven and/or monitored by the processor 1034. In some embodiments, the appliance 950 is "headless" or has no user interface 1038.

The appliance 950 can include a power supply 1040 that can provide power to the voltage regulator 1038 of the interface device 904 through connector 1032, connector 1012, and power line 1030.

The appliance 950 can include an interface device user interface extension 1042. The interface device user interface extension 1042 can include various input and output elements that are passed directly to the interface device 904 without being processed by the processor 1034. Examples of input and output elements of the interface device user interface extension 1042 include LEDs associated with the LED 1 line 1018 and LED 2 line 1020, a hardware restore button associated with the restore line 1016, or any other suitable input/output element.

An environment, such as a house, can include power switches, power outlets, light fixtures, light switches, fans, appliances, and other suitable devices. These devices are generally positioned at a location that can be considered as ideal real estate within the environment. For example, a house can include many light switches (e.g., one or more light switches in every room), which are located at convenient positions for user interaction (e.g., near doors, at a particular height, unobstructed by furniture or other objects, and the like). Light switches are also supplied with power from a power source through electrical wiring, providing constant power to the light switches. However, traditional light switches provide simple functionality, such as turning a device on and off, and lack the ability to conduct intelligent, contextual functions that can take advantage of the real estate and constant power supply associated with the light switches. Similarly, power outlets, light fixtures, appliances, and other devices in an environment do not take advantage of their locations in an environment to provide intelligent, contextual functionality.

Figure 11:
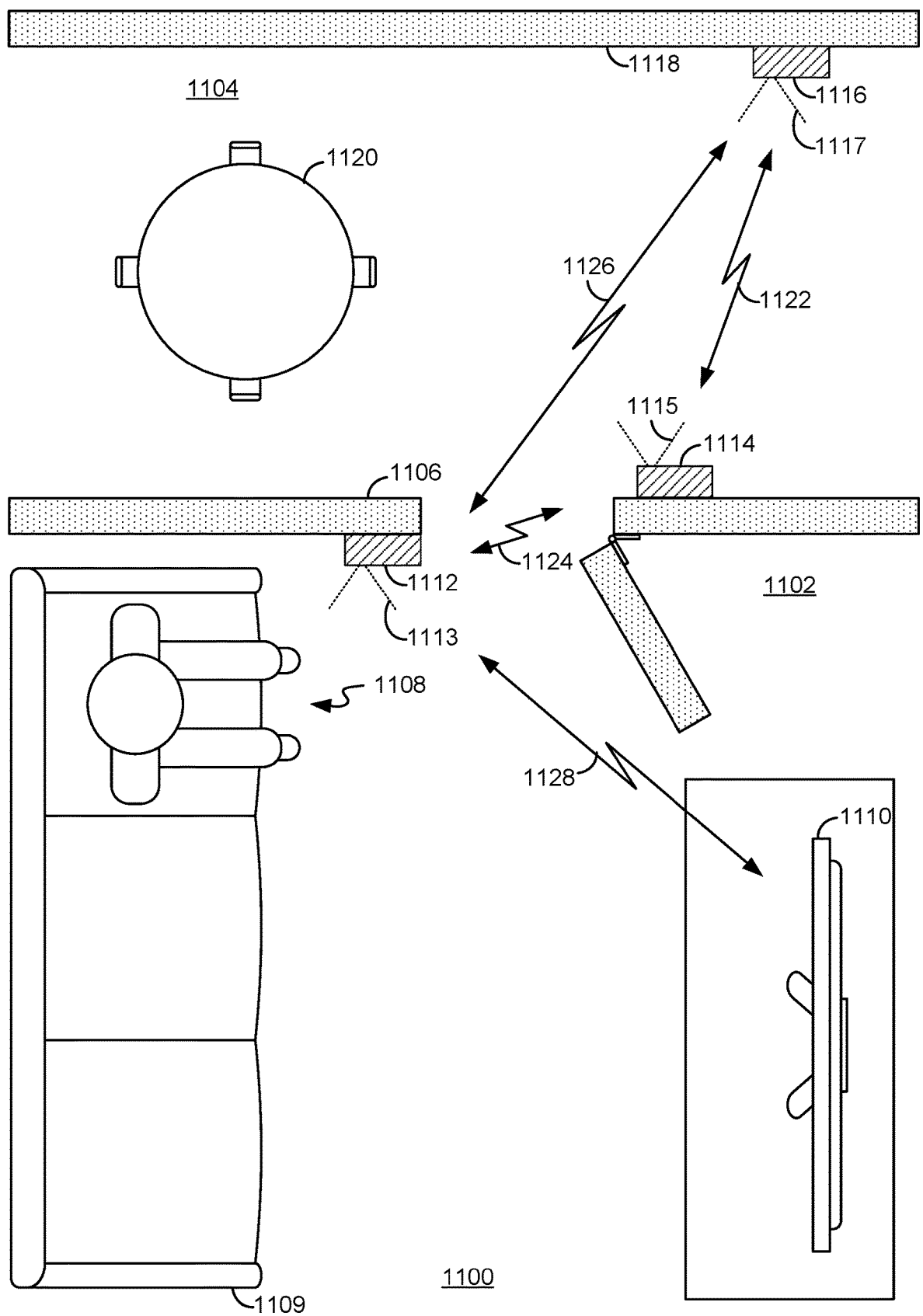
FIG. 11 is an overhead schematic diagram illustrating an environment including a contextual intelligence system according to certain aspects of the present disclosure.

FIG. 11 is an overhead schematic diagram illustrating an environment 1100 including a contextual intelligence system according to certain aspects of the present disclosure. The contextual intelligence system can include networked devices 1112, 1114, and 1116. In some examples, the contextual intelligence system can also include the server 1202 described with regard to FIG. 12 below. The networked devices 1112, 1114, and 1116 can be located in the environment 1100. Environment 1100 can be one or more spatial regions, open or enclosed. Examples of regions of an environment 1100 can include a room in a house, a kitchen, a backyard, a sun room, a den, or other locations. Environment 1100 can include a living room 1102 and kitchen 1104 of a house. The kitchen 1104 can be separated from living room 1102 by wall 1106. Kitchen 1104 can include table 1120 and wall 1118. Networked device 1112 can be located on wall 1106 and can be facing living room 1102. Networked device 1114 can also be located on wall 1106, on the other side of a door, but can be facing kitchen 1104. Networked device 1116 can be located on wall 1118 and can be facing kitchen 1104.

Networked device 1112, 1114, and 1116 can be devices with networking capabilities. Examples of networked devices 1112, 1114, 1116 can include smoke detectors, light fixtures, power outlets, light switches, phones, web-cameras, computers, and other network-connected devices. FIG. 11 illustrates an example in which networked device 1112 is a light switch that has been configured to communicate with networked devices 1114 and 1116 over one or more networks (e.g., a private local area network providing a Wi-Fi connection, a personal area network, a short range network such as Bluetooth, Zigbee or the like, or other suitable network). Further, FIG. 11 illustrates an example in which networked device 1114 is also a network-configured light switch and networked device 1116 is a network-connected power outlet (e.g., as shown in FIG. 18). Networked devices 1112, 1114, and 1116 can include network adapters that facilitate a wireless connection to other devices. For example, networked devices 1112, 1114, and 1116 can communicate with each other or with other devices (e.g., television 1110). In some cases, one or more networked devices are wirelessly connected to other networked devices, and one or more networked devices are not wirelessly connected to other networked devices. In some examples, networked devices 1112, 1114, and 1116 can communicate with each other (or other devices, such as television 1110) over communication links 1122, 1124, and 1126. It will be appreciated that the present disclosure is not limited to these examples and that networked devices 1112, 1114, and 1116 can be any combination of network-connected or network-connectable devices.

In some examples, networked devices 1112, 1114, and 1116 can also include one or more sensors. Examples of sensors that can be included in networked devices 1112, 1114, and 1116 include at least one of a microphone, a speaker, a video camera, a pressure sensor, a motion sensor, a gyroscope, an accelerometer, an optical sensor, and other sensors. In one illustrative example, the networked device 1112 is a network-connected light switch that includes a microphone and a camera, the networked device 1114 is a network-connected light switch that includes a microphone and a camera, and the networked device 1116 is a network-connected power outlet that includes a camera. The video camera of networked device 1112 can have a field of view 1113, the video camera of networked device 1114 can have a field of view 1115, and the video camera of networked device 1116 can have a field of view 1117. It will be appreciated that the present disclosure is not limited to these examples, and that networked devices 1112, 1114, and 1116 can include other types of network-connected devices and can include any combination of sensors.

In some examples, communication links 1122, 1124, and 1126 can facilitate transfer of data packets between networked devices 1112, 1114, and 1116, and the communication link 1128 can facilitate transfer of data packets between networked device 1112 and television 1110. For example, the communication links can include Bluetooth or Bluetooth Low Energy channels, Near Field Communication (NFC) channels, Wi-Fi channels, Radio-frequency identification (RFID) channels, Zigbee channels, ANT channels, or any other suitable channels.

Living room 1102 can include user 1108 sitting on a couch 1109. Actions of the user 1108 can cause various sounds, which are received at microphones of networked devices 1112 and 1114 as audio data. For example, if user 1108 is reading a book, the turning of pages can cause a sound. The movement of user 1108 on the couch can also cause a sound, which is received at networked device 1112 (e.g., a network-connected light switch with a microphone). In another example, user 1108 can be talking on a phone. Due to the physical attributes of audio propagation in living room 1102, both networked devices 1112 and 1114 (and possibly networked device 1116) can receive audio signals associated with sounds caused by user 1108. For example, if user 1108 is speaking on a phone in living room 1102, networked device 1112 (e.g., a network-connected light switch with a microphone) can receive an audio signal associated with spoken words of user 1108. Networked device 1114 can also receive an audio signal associated with the words spoken by the user 1108, however, the audio signal received at networked device 1114 may be attenuated (e.g., having a lower amplitude of sound intensity) as compared to the audio signal received at networked device 1112.

Accordingly, a contextual intelligence system can determine which room user 1108 is located in by comparing a parameter of an audio signal received at networked device 1112 with a parameter of an audio signal received at networked device 1114. The parameter can include any characteristic of the audio signal that can be used to identify a location or other context of the user. In one example, the parameter can include an intensity amplitude of the audio signal. In such an example, by determining that the amplitude of the audio signal received at networked device 1112 (which is facing living room 1102) is larger than the amplitude of the audio signal received at networked device 1114 (which is facing kitchen 1104), the contextual intelligence system can determine that user 1108 is in living room 1102, and not located in kitchen 1104. Other examples of parameters are provided herein.

In some examples, networked devices 1112, 1114, and 1116 can interact with other devices (e.g., television 1110) using the location determination of user 1108. For example, user 1108 can speak a command (e.g., "Turn on the TV"). Audio signals associated with the command may be received at the microphones of networked devices 1112 and 1114. Networked devices 1112 and 1114 can each independently analyze the received audio signals. For example, networked device 1112 can calculate a parameter of the audio signal received at networked device 1112, and networked device 1114 can also calculate a parameter of the audio signal received at networked device 1114. Examples of parameters may include an average amplitude over a period of time, an average power value over a period of time, a time of an intensity peak, signal-to-noise ratio, power of a noise signal, or any other parameter that can be used to identify a location or other context of the source of the audio signal. Further, networked device 1112 can communicate with networked device 1114, and vice versa.

In some examples, networked devices 1112 and 1114 can transmit messages to each other. The messages can include the parameter calculated at each networked device. For example, when networked device 1112 receives a message from networked device 1114, which includes the parameter calculated at networked device 1114, networked device 1112 can compare the parameter calculated at networked device 1112 with the received parameter from networked device 1114. A similar process can be performed at networked device 1114. Networked device 1112 can select a parameter of the two parameters (the parameter calculated at networked device 1112 or the parameter received from networked device 1114) using a condition. In one example of a condition, networked device 1112 can select the largest parameter (e.g., largest amplitude) of the two parameters. In another example of a condition, networked device 1112 can select the lowest parameter (e.g. lowest noise) of the two parameters. One of ordinary skill in the art will appreciate that other conditions may exist, such as whether the frequency band of the audio signal is low or high (e.g., a low frequency bad can indicate that a dryer machine is currently operating), the audio intensity is within a particular range, the time of a peak audio intensity, and other suitable conditions. The condition can be the same for both networked devices 1112 and 1114. In some examples, after selecting a parameter, networked devices 1112 and 1114 can identify a networked device associated with the selected parameter. For example, networked devices 1112 and 1114 can each identify that the audio signal with the largest amplitude corresponds to the audio signal received by the microphone of networked device 1112. In FIG. 11, networked device 1112 receives an audio signal with a larger intensity amplitude than the audio signal received at networked device 1114 because networked device 1112 is located closer to user 1108 (e.g., the source of the sound).

The networked device identified as having the largest parameter can be identified as a master networked device. In some examples, the master networked device can serve as a target-reference device with respect to commands spoken by user 1108. For example, the contextual intelligence system can determine that networked device 1112 is the master networked device because networked device 1112 is located in the same room as user 1108 or because the networked device 1112 is located closest to the user 1108 as compared to other networked devices. Further, the contextual intelligence system can identify devices associated with the master networked device. For example, in FIG. 11, the contextual intelligence system can identify target devices or locations (also referred to as end-point devices or locations) associated with networked device 1112 because networked device 1112 was determined to be the master networked device. In this example, television 1110 can be identified as a device associated with networked device 1112 because television 1110 is located in the same room as networked device 1112. Accordingly, if user 1108 speaks a command to interact with a device (e.g., "Turn on the TV"), the contextual intelligence system can identify which device or devices user 1108 is referring to. For example, when user 1108 speaks the command "Turn on the TV," the contextual intelligence system can identify that user 1108 is referring to television 1110, as opposed to any other television in the house, because the contextual intelligence system has identified that networked device 1112 is located closest to television 1110. As a result, user 1108 does not have to specifically identify which TV user 1108 is referring to in the command because the contextual intelligence system can identify the targeted device (i.e., television 1110) contextually from the audio information received at networked devices 1112 and 1114. Such a contextual intelligence system does not require a user to pre-define names or other characteristics of target devices so the target devices can be controlled. For example, in the event a user has two televisions in two rooms, the user does not have to name one television a first name and the other television a second name. Rather, the contextual intelligence system can determine which target device is being referred to by the user based on the context of the command from the user.

In some examples, when one networked device has been identified as the master networked device, the other networked devices that are not the master networked device can trigger a suspended status. For example, the suspended status can indicate that the networked device is not associated with the target location or target device. When a command is received at a networked device that has triggered the suspended status, the networked device does not perform the task associated with the command. However, with certain commands (e.g., "Turn off all of the lights in the house"), all networked devices, including the networked devices in suspended status, can process the command. For example, a master networked device can forward messages containing instructions to other networked devices in the environment. When a command (e.g., "Turn off all of the lights in the house") is spoken by a user, the master networked device can forward a message including an instruction (e.g., an instruction to turn off all lights) to the other networked devices. The other networked devices can comply with the instruction when the message is received. In another example, the master networked device can forward an instruction message to another specific networked device. For example, a networked coffee machine can be located in a kitchen with a networked light switch, and the master networked device can be a networked power outlet in a bedroom of the user. If the user is located in the bedroom and speaks the command "Turn on the coffee machine," the master networked device can forward an instruction message to the networked light switch in the kitchen. The networked device in the kitchen can then control the networked coffee machine according to the instruction message.

In some embodiments, the contextual intelligence system can identify a user's voice or other audio characteristic of the user based on a sound signature. For example, when user 1108 speaks, the contextual intelligence system can identify that it is the user 1108 that is speaking (as opposed to other users) based on a sound signature detected in the voice of user 1108. In some examples, the sound signature can be pre-programmed during installation of the contextual intelligence system. For example, a sound signature can include a specific audio wave associated with the voice of user 1108. Other examples of audio characteristics can include a pattern of sharp peaks in the audio intensity (e.g., representing shoes or stilettos walking on a hardwood surface), a low frequency audio wave (e.g., representing a sound associated with the operation of a dryer or washing machine), a specific pattern of an audio wave representing noises external to a house (e.g., indicating that a window has been left open), a specific pattern of a dog barking (e.g., representing that a dog is near a networked device), and other suitable audio characteristics.

In some embodiments, the contextual intelligence system can personalize characteristics of a room, a device, or other location to a user's preferences when the contextual intelligence system identifies that user 1108 is located in a particular room. For example, when user 1108 walks into living room 1102 and emits a sound (e.g., laughter, a voice command, a conversation), the contextual intelligence system can identify user 1108 based on one or more sound signatures. As an example, the contextual intelligence system can then change one or more characteristics of the room to preferences set by the user 1108 or learned by the contextual intelligence system. For example, when the user 1108 is identified, the contextual intelligence system can change the temperature or lighting of the room to match preferences of the user 1108. It will be appreciated that other settings of the room can be changed (e.g., music settings, television settings, or any other characteristic of the room). It will also be appreciated that settings of one or more devices can be changed based on user preferences (e.g., settings of a music device, settings of a television, or any other device in communication with a networked device of the contextual intelligence system). The contextual intelligence system can also maintain setting preferences for multiple users. For example, user 1108 can be in living room 1102 and another user can be in kitchen 1104. The contextual intelligence system can change the settings of living room 1102 based on preferences of the user 1108, and can change the settings of kitchen 1104 based on the preferences of the other user.

While FIG. 11 illustrates a house including networked devices 1112, 1114, and 1116, it will be appreciated that any number of networked devices can be included in environment 1100. Additionally, networked devices 1112, 1114, and 1116 can be used in any suitable environment 1100. For example, networked devices 1112, 1114, and 1116 can be located in a venue other than a house. A venue can include any indoor or outdoor location in which networked devices 1112, 1114, and 1116 can be installed.

It will also be appreciated that the contextual intelligence system can identify a room in which a networked device detects the absence of sound. For example, a networked device located in a particular room can determine that no sound has been detected for a period of time. The contextual intelligence system can interact with target devices based on the absence of sound detected by the networked device. For example, the networked device can transmit a control message that controls the air conditioning to turn off because no users are likely to be in the room. As another example, if a networked device located in a kitchen detects the absence of sound for a period of time, and if the stove top is on a high setting, the networked device can contextually identify that the stove top was unintentionally left on high. The networked device in the kitchen can then transmit a control message to the stove top to turn off the stove top.

It will also be appreciated that the contextual intelligence system can interact with target devices based on whether a networked device detects a sound of a particular wavelength or wavelength range. For example, if a networked device detects that a violin is being played by the user, the networked device can communicate with light fixtures in the room with the user to change the light setting so that it highlights a stand with sheets of music. In another example, if a networked device detects a sound associated with cheering, the networked device can communicate with one or more speakers in the room to change the settings of the one or more speakers to a surround sound setting.

Figure 12:
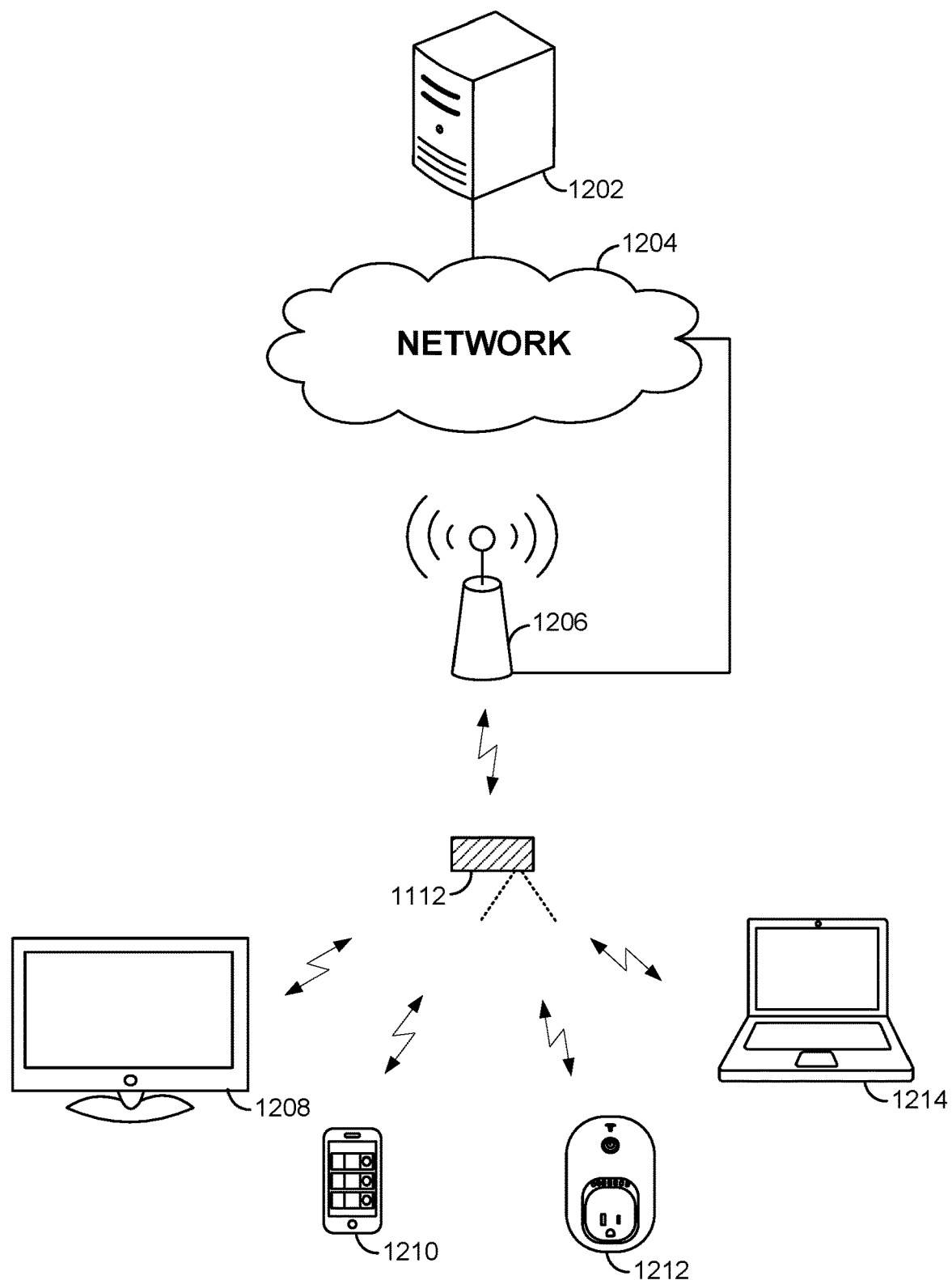
FIG. 12 is a schematic diagram illustrating a contextual intelligence system according to certain aspects of the present disclosure.

FIG. 12 is a schematic diagram illustrating a contextual intelligence system 1200 according to certain aspects of the present disclosure. Contextual intelligence system 1200 can include networked device 1112, a wireless gateway 1206, a network 1204, a server 1202, and target devices 1208, 1210, 1212, and 1214. Contextual intelligence system 1200 can facilitate the identification of a target location or a target device. While any number of networked devices can be used in contextual intelligence system 1200, as a non-limiting example, networked device 1112 is illustrated in FIG. 12. Further, while networked devices can communicate with each other (as illustrated in FIG. 11), networked devices can also communicate with target devices. For example, networked device 1112 can communicate with target devices 1208, 1210, 1212, and 1214.

Networked device 1112 can be a battery-operated device that has networking capabilities. In some cases, networked device 1112 can include rechargeable batteries that are capable of being reused or recharged. For example, the rechargeable batteries can include lithium-ion batteries, nickel-zinc batteries, zinc-cerium batteries, or any other rechargeable battery. The rechargeable batteries can be recharged using direct electrical contacts with a power source (e.g., an adapter connected to a wall outlet or electrical contacts coupled to line power). The rechargeable batteries can also be wirelessly recharged, such as using inductive charging techniques. The inductive charging techniques can include transferring energy from a charging station or device to networked devices 1112 through an inductive coupling. Other wireless charging techniques can be used. In some cases, a rechargeable self-contained power source other than a battery can be used in place of a battery, such as a super capacitor.

In some cases, networked device 1112 can be a light switch device having networking capabilities. In addition, networked device 1112 can include a microphone, video camera, and one or more speakers. The light switch networked device 1112 can be located on a wall, for example, near a door for entering or exiting a building. The light switch networked device 1112 can be positioned so as to receive sounds without obstruction. For example, the light switch networked device 1112 can be positioned so that there is no furniture obstructing a path of sound to a microphone of the light switch networked device 1112. Further, a light switch networked device 1112 can be located in every room of a house. The light switch networked device 1112 can also be connected to electrical wiring so that it is constantly connected to a power source. The sounds received at the light switch networked device 1112 can be converted to an audio signal and analyzed or processed at a processor included in the light switch networked device 1112. In another example, the audio signal can be transmitted to server 1202 using wireless gateway 1206 and network 1204. The networked device 1112 can be connected to the wireless gateway 1206 using a wired and/or wireless connection. Other examples of networked device 1112 can include a power outlet, a smoke detector, a light fixture, an alarm system, an air conditioning unit, or other device (each having networking capabilities).

Network 1204 can include one or more networks connected to wireless gateway 1206. For example, network 1204 can include a remotely-located cloud network. Further, network 1204 can include one or more private networks, one or more public networks, or any combination thereof. Network 1204 can also include one or more servers that can facilitate various aspects of the contextual intelligence system 1200. For example, network 1204 can include server 1202. Server 1202 can be one or more servers that can facilitate the automatic and intelligent identification of a target location or target device using the audio signals generated at the networked devices. Any analysis or processing of an audio signal received at a networked device can include analysis or processing of related data (e.g., a video signal received at a video camera included in the networked device).

For example, server 1202 can analyze audio signals received from gateway 1206 or networked device 1112 and sent to the server 1202. In some cases, server 1202 can perform audio feature or phoneme detection analysis on audio signals received at networked devices (e.g., networked device 1112). A phoneme is a distinct unit of sound in a particular language that can distinguish one word from another. Further, phonemes can be combined to make words. For example, phonemes of the word "sun" can include the sounds of "s," "u," and "n." Audio feature analysis can include calculating a confidence score of whether an audio feature (e.g., a voice command) is detected in the audio signal received at networked device 1112. Phoneme detection analysis can include detecting particular phonemes included in the audio signal received at networked device 1112.

Audio analysis can also be performed at the networked devices in addition to or in lieu of server 1202. Audio analysis performed at networked device 1112 can include an analysis of one or more parameters of the audio signal. For example, a parameter can include an average audio intensity over a period of time. Other examples of parameters can include an audio frequency analysis, an amplitude analysis of the audio signal, a signal-to-noise ratio calculation, or other noise detection analysis.

In some cases, the audio feature or phoneme detection analysis can be performed at server 1202, whereas, audio propagation analysis can be performed at networked device 1112. For example, a user near networked device 1112 can speak a command. Server 1202 can receive the audio signal corresponding to the voice command. Further, server 1202 can perform audio feature detection on the audio signal to identify the command spoken by the user. In some cases, audio feature detection can use significant processing resources. By performing the audio feature detection at server 1202, the system load of the networked devices can be substantially improved. In some cases, server 1202 can access one or more databases storing patterns of audio waveforms that are associated particular words. Server 1202 can compare the audio signal of the command spoken by the user to the stored patterns to determine confidence scores of the comparison. Server 1202 can finally formulate a word based on the confidence scores. The word can be further processed to indicate which command was spoken by the user.

In addition, networked device 1112 can receive the audio signal corresponding to the voice command. Networked device 1112 can analyze the audio signal to determine an average audio intensity over a period of time (e.g., a second, a few seconds, 10 seconds, or any other suitable period of time). Networked device 1112 can also receive average audio intensity calculations from other networked devices located nearby. The other networked devices may have also received an audio signal corresponding to the voice command. Networked device 1112 can compare the average audio intensity calculation computed at networked device 1112 with each of the received audio intensity calculations from other networked devices located nearby. Networked device 1112 can identify the largest average audio intensity calculation from the compared calculations to determine which calculation applies to the networked device that is nearest to the user speaking the voice command. For example, if networked device 1112 determines that the average audio intensity calculated at networked device 1112 is larger than the average audio intensity calculated at other networked devices, networked device 1112 can determine that it is the master networked device because it is located nearest to the user speaking the voice command.

While the examples above include analysis performed by the networked devices and the server, in some examples, networked device 1112 can perform all or part of the audio feature detection or phoneme analysis of the audio signal generated at networked device 1112. For example, networked device 1112 can receive a sound (e.g., a voice command emitted by the user) and generate an audio signal corresponding to the received sound. Further, networked device 1112 can analyze the generated audio signal and identify phonemes included in the audio signal. Networked device 1112 can then combine the phonemes to identify a word or phrase included in the audio signal.

In further examples, server 1202 can perform all or part of the identification of the master networked device. For example, networked devices 1112, 1114, and 1116 can each receive the same sound and generate an audio signal corresponding to the received sound. The audio signals generated at each of networked devices 1112, 1114, and 1116 can be forwarded to server 1202. Server 1202 can perform audio feature detection to determine the command included in the audio signals. Further, server 1202 can identify which networked device is nearest to the source of the sound by analyzing audio intensities of the audio signals.

Networked device 1112 can broadcast that it is the master networked device. Devices associated with networked device 1112 (e.g., target devices 1208, 1210, 1212, and 1214) can be identified as target devices because these devices are associated with networked device 1112, which is serving as the master networked device. For example, the voice command spoken by the user can apply to the target devices 1208, 1210, 1212, and 1214, instead of devices associated with other networked devices (e.g., which may be located in other areas of a house).

In some examples, networked device 1112 can be automatically and dynamically associated with target devices 1208, 1210, 1212, 1214. For example, networked device 1112 can communicate with nearby devices using a short-range communication signal (e.g., a Bluetooth signal). In this example, networked device 1112 can automatically pair itself to other Bluetooth-enabled devices in the near vicinity. If a user moves a Bluetooth enabled device to another area of a house, the Bluetooth-enabled device can be automatically paired to another networked device. In other examples, networked device 1112 can be associated with target devices 1208, 1210, 1212, and 1214 during an initialization process. For example, information identifying target devices 1208, 1210, 1212, and 1214 can be registered with networked device 1112 by a user through a user interface associated with the contextual intelligence system. Examples of information identifying a target device can include an Internet Protocol (IP) address, a MAC address, a Bluetooth address, or any other suitable address identifying the target device.

In some cases, server 1202 can also analyze video signals received using gateway 1206. For example, server 1202 can perform face detection analysis on video signals received at networked device 1112. Face detection analysis of the video signal can include calculating a confidence score of whether a face is detected in the video signal. The face detection can be of a particular face (e.g., detection of specific facial characteristics of a particular user) or of a face in general (e.g., detection of eyes, nose, mouth, or other characteristic of a face). Face detection can also include detecting facial expressions, such as a smile, a frown, a neutral face, or other feature. Analyzing the video signals can also include detecting a body gesture, such as a thumbs up, a finger point, a hand wave, or other gesture. Other examples of analysis can include analysis of audio intensity, image histograms, color intensity, temporal events, spatial events, or other detectable features of the video signal or its metadata.

In other cases, any video signal analysis (e.g., face detection, gesture detection, and the like) can be performed at the networked devices. For example, networked device 1112 can capture real-time video and generate a corresponding video signal. The video signal can be stored in a storage device of the networked device 1112. In this example, networked device 1112 can perform one or more analysis techniques on the real-time video signal. Further, networked device 1112 can identify the user included in the video signal and determine an interaction to be performed. For example, networked device 1112 can transmit a signal to an air conditioning unit controlling the room temperature to a temperature preferred by the detected user.

In addition, server 1202 can transmit various audio or video files to target devices 1208, 1210, 1212, and 1214 when a command is received from a user to play the audio or video files on one of the devices 1208, 1210, 1212, or 1214. For example, a video file can include a video clip. In this example, a user can speak the commands "Turn on the TV" and "Play my favorite video clips." Contextual intelligence system 1200 can identify which TV the user is referring to (e.g., television 1208) based on the audio propagation analysis. Further, contextual intelligence system 1200 can also instruct server 1202 to transmit the user's favorite video clips (e.g., video clips from a recent vacation)

to television 1208 for display. The user's favorite video clips can be previously stored in server 1202.

Target devices 1208 through 1214 can be portable or non-portable electronic devices capable of displaying video files, playing audio files, or performing other functions specific to each device. For example, the target devices can include television 1208, smartphone 1210, power outlet 1212, and laptop 1214. Television 1208, smartphone 1210, power outlet 1212, and laptop 1214 can receive the previously stored audio or video files from server 1202 and play the audio or video files for the user.

Figure 13A:
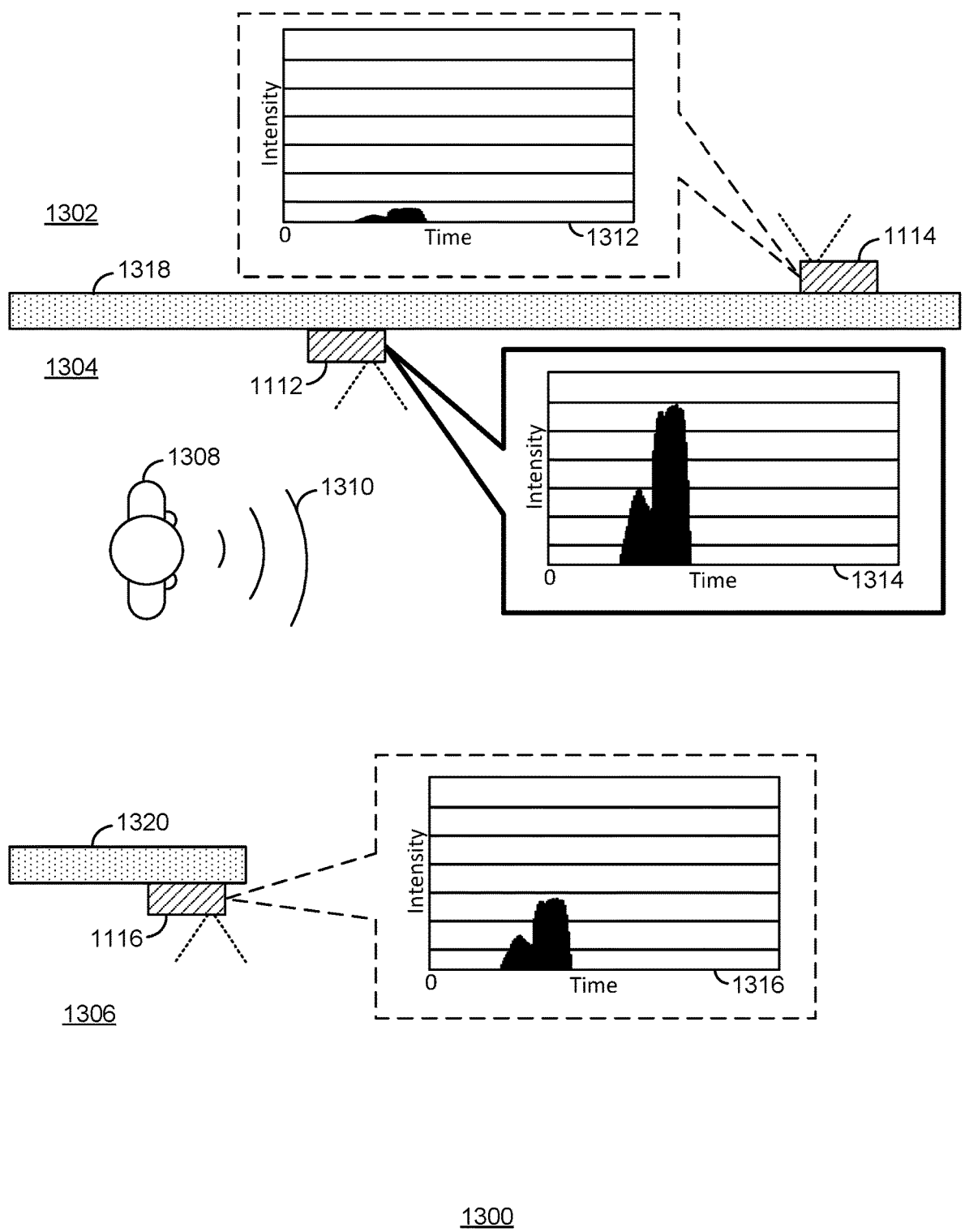
FIG. 13A is a diagram illustrating intensity measurements for intelligently identifying a master networked device according to certain aspects of the present disclosure.
Figure 13B:
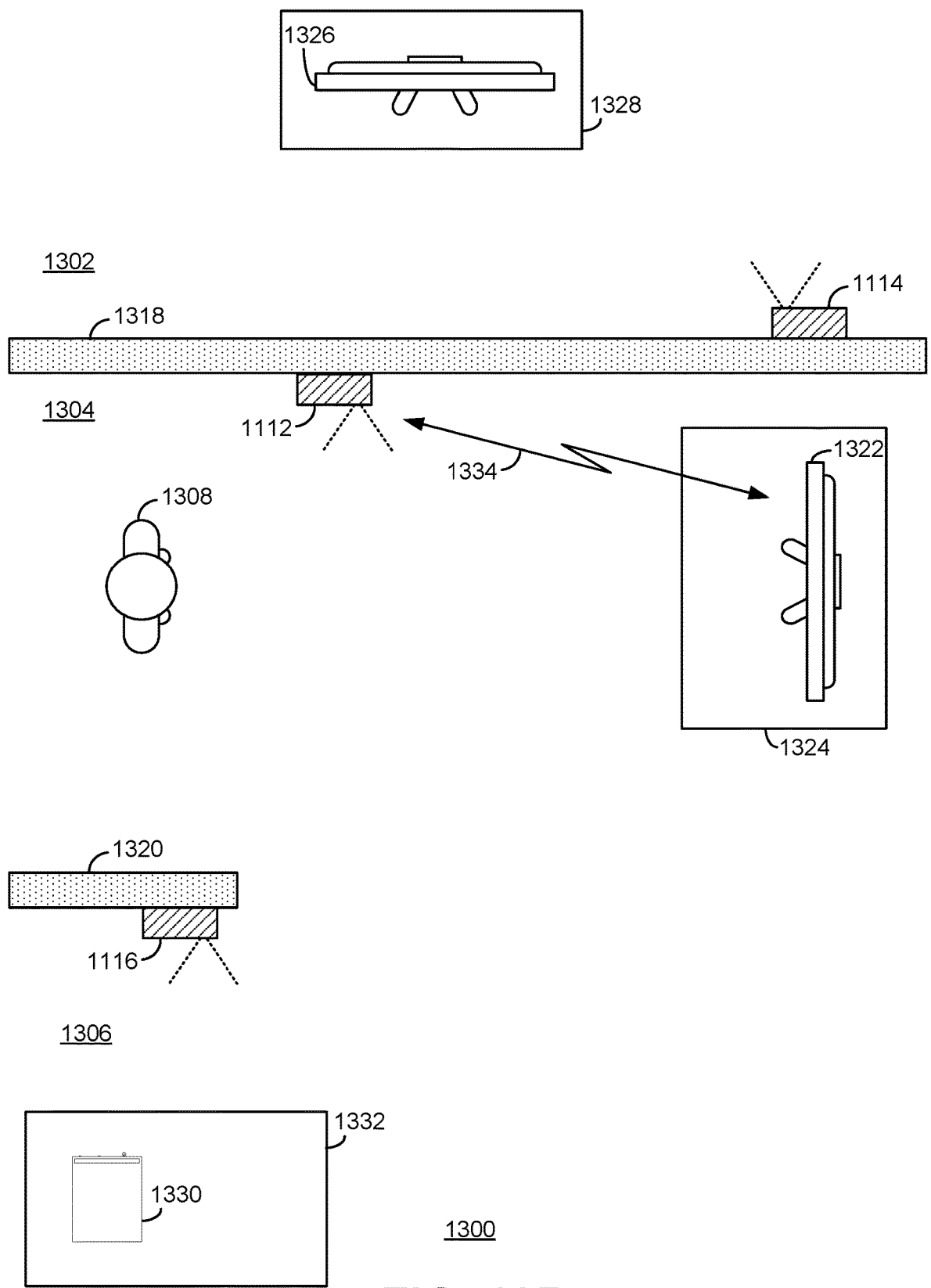
FIG. 13B is a diagram illustrating the intelligent controlling of a target device according to certain aspects of the present disclosure.

FIGS. 13A-13B illustrate examples of identifying a master device and controlling a target device associated with the master device. Specifically, FIG. 13A is a diagram illustrating intensity measurements used for intelligently identifying a master networked device according to certain aspects of the present disclosure, and FIG. 13B is a diagram illustrating the intelligent controlling of a target device according to certain aspects of the present disclosure.

FIG. 13A illustrates an environment 1300. Environment 1300 can be any space, such as a house, a workplace, an outdoor venue with network capabilities, or other suitable space. For example, environment 1300 can include rooms 1302, 1304, and 1306. Rooms 1302 and 1304 can be separated by wall 1318. Rooms 1304 and 1306 can be partially separated by wall 1320. That is, wall 1320 may not entirely separate rooms 1304 from 1306. In addition, environment 1300 can include networked devices 1112, 1114, and 1116. Networked device 1112 can be located on wall 1318 facing room 1304. Networked device 1114 can also be located on wall 1318 but facing room 1302. Networked device 1116 can be located on wall 1306 facing room 1306. Networked devices 1112, 1114, and 1116 can communicate with each other. For example, networked devices 1112, 1114, and 1116 can each broadcast information so that the other networked devices receive the broadcasted information.

In some cases, networked devices 1112, 1114, and 1116 can be light switches having networking capabilities and at least one of, for example, a microphone, a video camera, a speaker, a motion sensor, and/or a capacitive touchscreen to serve as an interface panel. For example, the light switches may be located at an industry-specific level on wall 1318 or wall 1320 (e.g., 48 inches, 36 inches, or any other appropriate height from the floor). Other examples of networked devices can include a power outlet, a smoke detector, a light fixture, or other device located in the environment 1300.

Environment 1300 can also include user 1308. User 1308 can emit a sound 1310. The sound 1310 includes audio signals representing the sound made by the user 1308. For example, sound 1310 can be a voice command (e.g., "Turn on the TV", "Turn down the lights", "Lower the temperature", or other suitable voice command). As the user speaks or makes other sounds, the sound 1310 propagates through environment 1300. Sound 1310 reaches networked device 1112 and networked device 1116. Even though networked device 1114 is located on the other side of wall 1318, networked device may receive an attenuated version of sound 1310. Environment 1300 may include other networked devices (not shown) that may or may not receive sound 1310. Each networked device 1112, 1114, and 1116 includes a microphone. When the networked devices receive sound 1310 (e.g., an analog signal), each networked device generates an audio signal (e.g., a digital representation of the sound) corresponding to the received sound 1310.

As illustrated in the example of FIG. 13A, each networked device 1112, 1114, and 1116 receives sound 1310 and generates an audio signal. In some cases, networked devices 1112, 1114, and 1116 each analyzes the generated audio signal. In some examples, the audio signal generated at each networked device may be different from the audio signal generated at other networked devices. The difference in audio signals is due to the audio propagation effects of sound 1310 as it travels through environment 1300. For example, the audio signal generated at networked device 1112 may have more intensity than the audio signal generated at networked device 1116 because networked device 1112 is located closer to the source of sound 1310. As an example, networked device 1112 can generate an audio signal represented by graph 1314, networked device 1114 can generate an audio signal represented by graph 1312, and networked device 1116 can generate an audio signal represented by graph 1316.

In some cases, each networked device 1112, 1114, and 1116 can be configured to analyze the generated audio signal to calculate one or more parameters of the audio signal. Networked devices 1112, 1114, and 1116 may include one or more processing devices (e.g., a data processor) to perform the calculations. For example, networked devices 1112, 1114, and 1116 can calculate an average audio intensity over a period of time (e.g., 1 second, 2 seconds, a few seconds, 10 seconds, or any other suitable amount of time). Using networked device 1112 as an example, networked device 1112 can calculate an average audio intensity by dividing the total audio intensity over a period of time by the period of time. Networked device 1112 can also store the calculated average audio intensity.

Networked device 1112 can be configured to broadcast the calculated average audio intensity and an identifier (e.g., an identifier code) that identifies networked device 1112 to networked devices 1114 and 1116. Likewise, each of networked devices 1114 and 1116 can also broadcast calculated average audio intensity values together with an identifier code unique to each networked device 1114 and 1116. After the broadcasting, each networked device can store its own average audio intensity calculation and the received audio intensity calculations of the other networked devices. For example, networked device 1112 can store the average audio intensity value calculated by the data processor at networked device 1112 and the average audio intensity values of each of networked devices 1114 and 1116.

Each networked device can compare the stored average audio intensity values. For example, networked device 1112 can compare its own average audio intensity values with the average audio intensity values of networked devices 1114 and 1116. In doing so, networked device 1112 can determine that its average audio intensity value is the largest from among the three networked devices 1112, 1114, and 1116. Likewise, each of networked devices 1114 and 1116 may also compare the average audio intensity values and similarly conclude that networked device 1112 has the largest average audio intensity value. For example, each networked device 1112, 1114, and 1116 can determine that networked device is to serve as the master device for that particular command represented by sound 1310.

In some cases, the master device can be dynamically identified based on the comparison of calculated values at each networked device. For example, at one time user 1308 can emit a first sound at a position nearest to networked device 1112. In this example, networked device 1112 would be identified as the master device with respect to the first sound because it would receive and calculate the largest average audio intensity values. At another time, user 1308 can emit a second sound at a position nearest to networked device 1116. At this time, networked device 1116 would dynamically be identified as the master device for the second sound because it would receive and calculate the largest average audio intensity values.

Once a master device is identified, the contextual intelligence system can determine a target location. In some cases, the target location can correspond to the location of user 1308. For example, the contextual intelligence system can determine a location of user 1308 contextually by analyzing audio signals generated at each networked device. As another example, the target location may be the location associated with the master device. As illustrated in the example of FIG. 13A, networked device 1112 is identified as the master device (as indicated by the bold solid line around graph 1314). Accordingly, the contextual intelligence system may determine that user 1308 is located in room 1304 and that room 1304 is the target location.

When the master device is identified, each networked device can broadcast an identifier code of the identified master device. In the example of FIG. 13A, each networked device may determine that networked device 1112 is the master device and then broadcast an identifier code of networked device 1112. If the networked devices identify multiple master devices for a particular sound or command, the contextual intelligence system can solve the discrepancy. For example, the contextual intelligence system can resolve the discrepancy by performing a resolution process. One example of the resolution process can include selecting one of the multiple master devices as the master device. Another example can include re-performing the comparison of calculated values to determine the master device. Yet another example can include outputting an audio signal to the speakers of the networked devices informing the user that an error occurred, and having the user select the master device or instructing the system to re-perform the comparison to determine the master device. One of ordinary skill will appreciate that other suitable resolution processes can be performed to resolve the discrepancy in master device determinations. In other examples, the networked devices may not broadcast the identifier code of the identified master device because each networked device has already identified the master device based on the comparison of calculations.

It will be appreciated that environment 1300 can include more or less networked devices than shown in FIG. 13A. Further, it will also be appreciated that networked devices can include light switches, light fixtures, smoke detectors, power outlets, or other suitable devices. It will also be appreciated that networked devices can calculate parameters other than the average audio intensity. For example, networked devices can calculate other parameters, including, for example, an audio frequency, a time difference between peaks in audio signals, signal-to-noise ratios, a particular type of sound (e.g., clapping, cheering, walking on the floor with shoes/heels), or any other parameter that can be used to identify a master device from among networked devices.

FIG. 13B is a diagram illustrating the intelligent controlling of a target device using the target location according to certain aspects of the present disclosure. FIG. 13B is an extension of the example illustration of FIG. 13A where networked device 1112 was identified as the master device and room 1304 was identified as the target location.

In some cases, each networked device can be associated with one or more devices. In the example illustration of FIG. 13B, networked device 1112 is associated with television 1322 located in room 1304 on table 1324, networked device 1114 is associated with television 1326 located in room 1302 on table 1328, and networked device 1116 is associated with coffee machine 1330 located in room 1306 on table 1332. For example, networked device 1112 can be automatically associated with television 1322 by transmitting a short-range signal (e.g., a Bluetooth signal) requesting to be paired with television 1322. Networked device 1114 can similarly be associated with television 1326, and networked device 1116 can similarly be associated with coffee machine 1330. When a networked device is identified as a master device, then the room in which the networked device is located can be identified as the target location, and any devices associated with the networked device can be identified as the target devices.

In the example of FIG. 13B, environment 1300 includes two televisions (e.g., television 1322 and 1326), which are located in different rooms. Networked device 1112 has been identified as the master device, and as such, room 1304 can be identified as the target location and television 1322 can be identified as a target device. When user 1308 speaks a command (e.g., "Turn on the TV"), the contextual intelligence system can efficiently and accurately determine that user 1308 is referring to television 1322, instead of television 1326. User 1308 does not have to specifically identify a name or identifier of television 1322 in the voice command "Turn on the TV" because the contextual intelligence system can determine which television user 1308 is referring to using the identified location of user 1308.

In some cases, a device can be controlled even though it is not designated as a target device (e.g., a device associated with a master device). For example, even if user 1308 is located in room 1304 and networked device 1112 is currently serving as the master device, user 1308 can speak a command (e.g., "Start the coffee machine") to control coffee machine 1330 in room 1306. In this example, if coffee machine 1330 is the only coffee machine in environment 1300 (e.g., a house with multiple rooms), the contextual intelligence system may ascertain that user 1308 is referring to coffee machine 1330 in the command. Further, networked device 1112 can forward the command to networked device 1114 so that networked device 1114 can send the command to coffee machine 1330. For example, forwarding the command can include relaying the command from one networked device to another until the command is received at networked device 1114.

It will also be appreciated that the master device can perform other specific functions. For example, the master device can serve as a gateway to the Internet for the other networked devices. In this example, if a networked device has to query a server located in a network (e.g., network 1204), the query can be forwarded to the master device, and the master device can access the requested information from the server.

Figure 14:
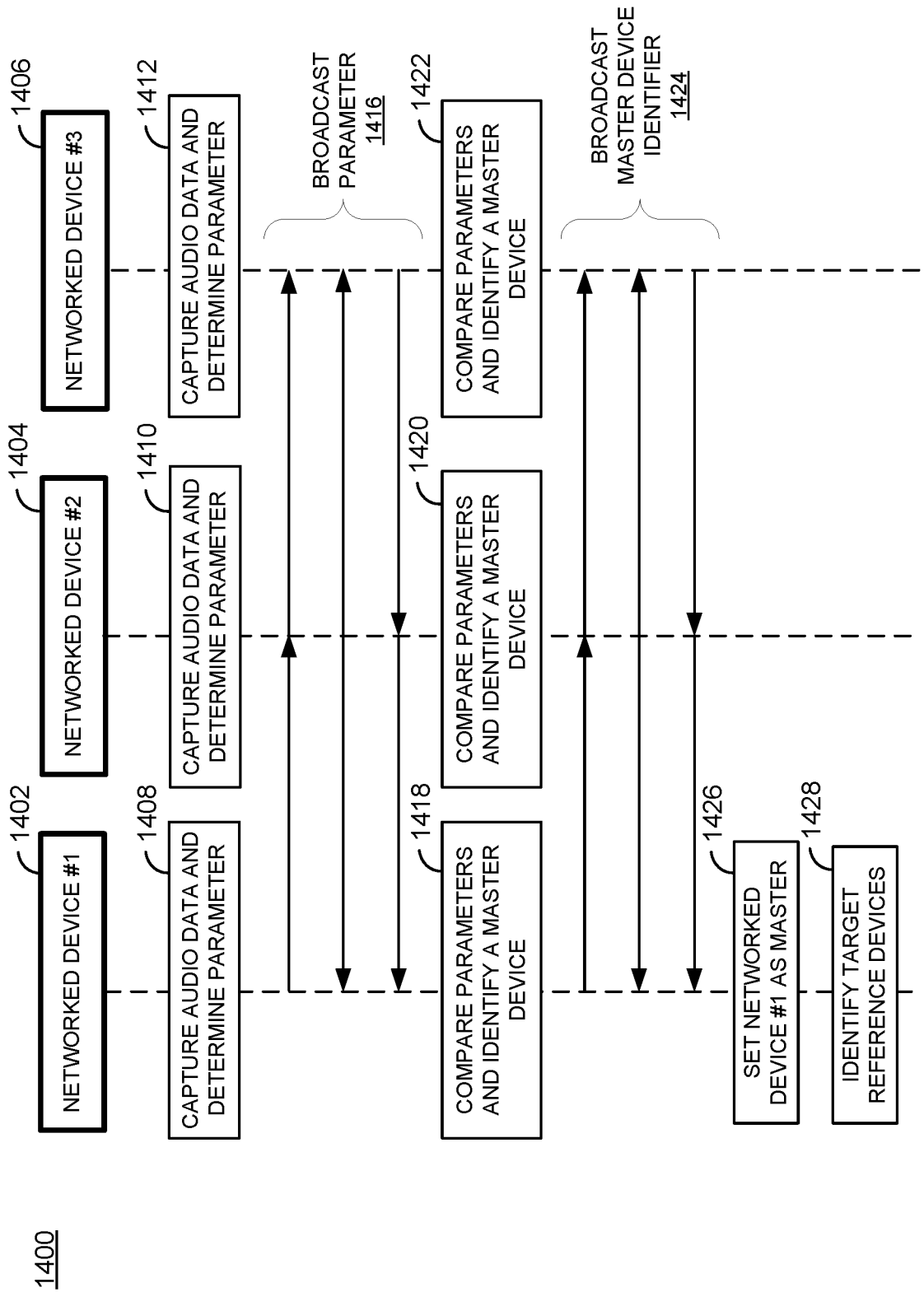
FIG. 14 is a swim lane diagram illustrating a data flow in a contextual intelligence system according to certain aspects of the present disclosure.

FIG. 14 is a swim lane diagram illustrating a data flow of process 1400 in a contextual intelligence system according to certain aspects of the present disclosure. A contextual intelligence system can include networked device #1 1402, networked device #2 1404, and networked device #3 1406. In some embodiments, the contextual intelligence system can be hubless, in that a central hub is not needed for the system to operate. For example, each of networked device #1 1402, networked device #2 1404, and networked device #3 1406 can serve as a master device at any given time. Further, networked device #1 1402, networked device #2 1404, and networked device #3 1406 can each independently communicate with each other or with a wireless gateway (e.g., wireless gateway 1206) without having to first access a base station or hub. In other embodiments, a central hub may be included in the contextual intelligence system. It will be appreciated that process 1400 can include more or fewer networked devices as shown in FIG. 14.

At block 1408, networked device #1 1402 can capture audio data and determine a parameter of the audio data. In some cases, networked devices can include a microphone. When a sound reaches the microphone of a networked device, an audio signal can be generated, stored, and analyzed. For example, when a user speaks a sound (e.g., a voice command), each of networked device #1 1402, networked device #2 1404, and networked device #3 1406 can receive the sound and generate an audio signal corresponding to the sound. At blocks 1410 and 1412, networked device #2 1404 and networked device #3 1406 can respectively capture audio data and determine a parameter of the audio data. For example, the parameter can be an average audio intensity. It will be appreciated that other parameters of audio signals can be used, for example, a timing of a peak in the audio signal, a signal-to-noise ratio, a frequency analysis, a noise analysis, or other suitable parameters.

At block 1416, each of networked device #1 1402, networked device #2 1404, and networked device #3 1406 can broadcast its calculated parameter. In some cases, each networked device can broadcast the parameter it calculated to notify other networked devices of the calculated parameter. In other cases, a networked device can transmit (over a wired or wireless connection) its calculated parameter to a wireless gateway and the wireless gateway can broadcast the calculated parameter to other networked devices. The broadcasting of the calculated parameter by each networked device can facilitate communication between the networked devices. For example, networked device #1 1402 can transmit its calculated parameter to networked device #2 1404. Networked device #1 1402 can also receive the parameter calculated at networked device #2 1404. Networked devices can also communicate other information to each other, for example and not limited to, identity information (e.g., an identifier code identifying the networked device), status information (e.g., on, off, error code), power information (e.g., current voltage/amperes or remaining battery power), or other suitable information.

At block 1418, networked device #1 1402 can compare the received parameters with the parameter calculated at networked device #1 1402. In addition, at block 1418, networked device #1 1402 can identify a master device based on the comparison of the parameters. For example, networked device #1 1402 can compare the parameter it calculated with each of the parameters received from networked device #2 1404 and networked device #3 1406. In some cases, networked device #1 1402 can identify the largest parameter from the compared parameters. For example, networked device #1 1402 can select the largest average audio intensity value to determine which networked device is located closest to the user. In other cases, networked device #1 1402 can select the smallest parameter from the compared parameters. For example, networked device #1 1402 can identify the smallest noise levels to determine which rooms are empty of users (e.g., so that air conditioning or lights can be turned off to save energy). In other cases, networked device #1 1402 can select a parameter, from amongst the compared parameters, that satisfies a condition. For example, networked device #1 1402 can identify a parameter that satisfies a threshold or specific range of signal-to-noise ratio. Networked device #1 1402 can identify a networked device associated with the selected parameter, for example, using an identifier code transmitted along with the parameter that identifies the networked device. Similarly, at blocks 1420 and 1422, networked devices #2 1404 and #3 1406 can also compare parameters and identify a master device.

At block 1424, each networked device of networked device #1 1402, networked device #2 1404, and networked device #3 1406 can broadcast the determined identity (e.g., as an identifier code identifying a networked device) of the master device. For example, each networked device may determine that networked device #1 1402 is to serve as the master device based on the comparison of parameters in blocks 1418, 1420, and 1422. In this example, each networked device would broadcast an identifier code of networked device #1 1402 so as to notify all of the networked devices that networked device #1 1402 is currently the master device. In some cases, the networked devices 1402, 1404, and 1406 do not broadcast the identifier code of the networked device serving as the master device because each networked device has already determined the identity of the master device based on the comparison of parameters. Broadcasting of the identity of the master device can be performed, for example, as a check that all of the networked devices identified the same master device. In addition, when the identity of the master device is broadcasted, the broadcast message can also include an instruction for networked devices that are not identified as the master device to operate in a suspended status. For example, a networked device that is operating in a suspended status can process global commands only (e.g., "Turn off all of the lights in the house").

Any networked device may serve as a master device at any time based on a given audio signal. For example, at a first time, a networked device may serve as a master device, and at a later second time another networked device may serve as the master device. For example, the master device may be determined periodically, randomly, or at a particular time (e.g., every time a command is spoken by the user, every time a sound is recognized as a command, or other signal that causes an action to take place by the contextual control system). It will be appreciated that the more than one master device may be identified in the contextual intelligence system at a given time. For example, if a first user is located on a first floor of a house, and if a second user is located on a second floor of the house, the contextual intelligence system can determine that at least two master devices should be identified; one near the first user and another near the second user.

At block 1426, the contextual intelligence system determines that networked device #1 1402 is to serve as the master device. It will be appreciated that any networked device can serve as the master device. When a networked device is determined to serve as the master device, the location associated with the master device (e.g., the room in which the master device is located) is identified as the target location. In some cases, the target location identifies the location (e.g., room) in which the user is located.

At block 1428, the contextual intelligence system determines one or more target devices associated with the target location. In some cases, a target location can be associated with one or more target devices. In some cases, a networked device can also be associated with one or more target devices. For example, a room may include a networked light switch, a television, and a networked air condition controller. When the networked light switch (e.g., a networked device) is selected to serve as the master device, the television and the networked air condition controller may be identified as the target devices (e.g., based on the target location and/or the networked device that is acting as the master device). Further, when the user speaks a command, the contextual intelligence system can ascertain that the command corresponds to the target devices because the user is located in the target location or nearest to the networked light switch. For example, if the user's house includes a living room and a bedroom, and each of the living room and the bedroom include a television, the contextual intelligence system may determine that the user is in the living room based on audio propagation analysis, as described above. If the user speaks the command "Turn on the TV," the contextual intelligence system can turn on the television in the living room, and not the television in the bedroom. In this example, the user does not have to separately name or identify the televisions in the living room and bedroom because the contextual intelligence system can identify the location of the user, and therefore, the specific devices of interest to the user.

Figure 15:
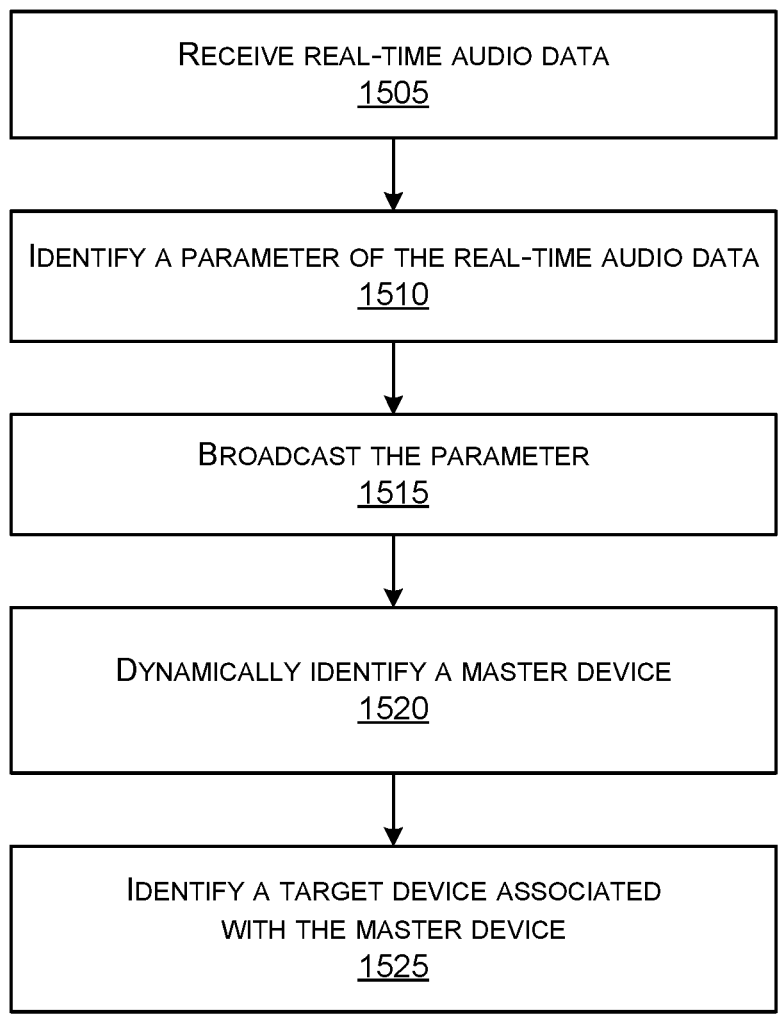
FIG. 15 is a flowchart illustrating a process for intelligently identifying a master device according to certain aspects of the present disclosure.

FIG. 15 is a flowchart illustrating a process 1500 for intelligently identifying a master device according to certain aspects of the present disclosure. Process 1500 can be performed at least in part at one or more networked devices (e.g., networked devices 1112, 1114, and 1116), a server (e.g., server 1202), or a cloud network or server. For example, process 1500 is described herein as being performed at a plurality of networked devices that are configured to communicate with each other. Networked devices may be located in an environment (e.g., a house having rooms). For example, a networked device can be a light switch having networking capabilities and at least one of a microphone, a video camera, and a speaker.

At block 1505, each networked device can receive real-time audio data at a microphone (e.g., an audio capture device) included in the networked device. For example, when a user emits a sound (e.g., a voice command), the sound travels through the environment and may be received at one or more networked devices. The one or more networked devices that received the sound can convert the received sound into an audio signal, and store the audio signal as audio data.

At block 1510, a networked device identifies a parameter of the real-time audio data. For example, a networked device can calculate an average audio intensity of the real-time audio data. The parameter may correspond to a characteristic of the audio data. As an example, if the parameter is an average audio intensity, the parameter may correspond to how loud the sound (e.g., how strong the sound wave is) is when it is received at the networked device. It will be appreciated that parameters may include other features of the real-time audio data, for example, signal-to-noise ratio, audio intensity peaks, a frequency, or other suitable features.

At block 1515, a networked device can broadcast the calculated parameter to other networked devices. In some cases, the networked device may directly transmit the calculated parameter to other networked devices using communication links (e.g., a short-range communication link, such as Bluetooth). In other cases, the networked device may wirelessly transmit the calculated parameter to a wireless gateway, which can relay the calculated parameter to other networked devices in the environment. Each network device may receive the calculated parameters of the other networked devices in block 1515. For example, a networked device can store the calculated parameter calculated by its data processor, and can also store the calculated parameters received from other networked devices.

At block 1520, a networked device can dynamically identify a master device from amongst the networked devices in the environment. In some cases, one or more networked devices in the environment can compare calculated parameters (e.g., broadcasted and received in block 1515) and select a parameter that satisfies a condition. The networked device associated with the calculated parameter that satisfies the condition can be identified as the master device.

At block 1525, a networked device can identify a target device associated with the master device. In some cases, the networked device can control the target device (e.g., turn on/off the target device). For example, the networked device can use a command spoken by the user to control the target device.

FIG. 16A is an illustration of an example of a front view of a networked device (network device 1600), in accordance with an embodiment of the invention. FIG. 16B is an illustration of an example of a side view of a networked device (network device 1600), in accordance with an embodiment of the invention. Network device 1600 can have an in-wall light switch-style structure. The network device 1600 may include any of the network devices 102, 104, or 106 described herein. In some examples, the network device 1600 may be a home automation network device. For example, the network device 1600 may include a home automation switch that may be coupled with a home appliance or target device. A user may access the network device 1600 in order to control, and/or configure various target devices located within the user's home. The user may access the network device 1600 remotely (e.g., wirelessly). For instance, the user may remotely control appliances such as a television, radio, light, microwave, iron, space heater, wall A/C unit, washer, dryer, fan, and/or the like.

In some embodiments, the network device 1600 may include a WiFi enabled switch that connects target devices, home appliances, or other electronic devices to a compatible 802.11b/g/n/ac WiFi network. The network device 1600 may thus allow users to locally or remotely turn devices on or off from anywhere, program customized notifications, and/or change device status, position, speed or level, among other types of control. The network device 1600 may further allow a user to create custom schedules or have devices respond to sunrise or sunset, indoor or outdoor temperature, audio level, light level, sensor conditions, or other suitable conditions.

In the example of FIGS. 16A-16B, network device 1600 can be configured to include speaker 1648, video capture device 1640 (e.g., a camera), and audio capture device 1654 (e.g., a microphone). Video capture device 1640 can include lens 1644. Speaker 1648, video capture device 1640, and audio capture device 1654 can each be connected to circuit board 1626, for example, using transmission line 1628. In other examples, network device 1600 can also include additional sensors, such as motion sensors, pressures sensors, and other sensors. In some instances, the main switching panel 1602 and/or room-facing wall 1620 can include these additional sensors.

The network device 1600 can include a main switching panel 1602 (e.g., a power switch) that may be depressed in order to change a power state of an electrical device drawing power through network device 1600. In some cases, main switching panel 1602 can be or include a capacitive touchscreen. The capacitive touchscreen can serve as an interface panel with which a user can interact. For example, in the cases where main switching element is or includes a capacitive touch screen, a user can perform a pinch-to-zoom motion (e.g., with a thumb and an index finger) on the capacitive touchscreen to control a state of a target device (e.g., to turn the target device on or off). As another example, a user can perform the pinch-to-zoom motion on the capacitive touchscreen to control a level of a target device (e.g., to dim or increase a light level of one or more lights).

In some embodiments, main switching panel 1602 can be configured similar to a decorator style rocker switch, but with a push-button (e.g., momentary) configuration instead of a two-state (i.e., on/off) configuration. Other configurations of a main switching panel 1602 can be used. The room-facing wall 1620 (e.g., which can include a panel) can include one or more main switching panels 1602, some of which may be used to send a wireless signal and/or command from the network device 1600 instead of used to change the power state of an electrical device drawing power through the network device 1600. In some embodiments, the main switching element can be a depressible flat surface that includes the capacitive touchscreen.

In some embodiments, one or more light sources may be integrated with or located behind the room-facing wall 1620, such as behind a main switching panel 1602. For example, a light-emitting diode (LED) may be located on a circuit board under the main switching panel 1602. The light source may be illuminated when the network device 1600 is providing power to the electrical device, and may not be illuminated when the network device 1600 is not providing power to the electrical device. Any display can be presented using a light source and optionally one or more of a light pipe to direct the light source, a mask to provide a user-recognizable pattern to the light source, and a lens. In some examples, main switching panel 1602 can be a display panel. The display panel can display various information and can be illuminated by the light source located under the main switching panel 1602.

In other embodiments, a variable level switch, such as a dimmer type switch, is provided on room-facing wall 1620 of network device 1600. In further embodiments, a touchscreen display is provided on room-facing wall 1620 of the network device 1600. The touchscreen display can allow a multitude of user inputs, such as to control and program network device 1600 or target devices connected to the network device 1600. Including a touchscreen display on network device 1600, for example, optionally provides for the ability to use network device 1600 as both a network device (102, 104, 106) and an access device 108.

The network device 1600 further includes a communications signal indicator 1604. The signal indicator 1604 may indicate whether the network device 1600 has access to a communications signal, such as a WiFi signal. For example, the signal indicator 1604 may include a light source (e.g., a LED) that illuminates when the network device 1600 is connected to a communications signal. The light source may depict different colors or other characteristics (e.g., flashing, dimming, or the like) to indicate different levels of signal strength or mode of operation.

The network device 1600 includes a restore button 1610. The restore button 1610 may allow a user to reset the network device 1600 to factory default settings. For example, upon being depressed, the restore button 1610 may cause all software on the device to be reset to the settings that the network device 1600 included when purchased from the manufacturer.

Resetting these settings to factory default can include removing wireless access settings (e.g., SSID, password, and others), network IDs, security keys, saved rules, stored names and/or images, user settings, and other information.

In some embodiments, the restore button 1610 can respond only to certain predetermined patterns of being depressed, such as press-and-hold, multiple presses, or multiple presses and hold. In some embodiments, the restore button 1610 can respond to different patterns of being depressed with different results, such as restoring the network device 1600 to factory defaults when the button is pressed and held for a certain length of time (e.g., five seconds), but only removing the wireless access settings (e.g., not removing saved rules, stored names, and/or stored images) when the button is pressed five times in quick succession and then held for ten seconds. In some embodiments, the restore button 1610 can be used to only reset the user-defined rules and/or other user-defined settings of the network device 1600, without removing any wireless access settings, for example if a user desired to use the network device 1600 within the same network, but for a different purpose (e.g., moving the network device 1600 to a different room).

The restore button 1610 can be located on the room-facing wall 1620 such that the button is readily accessible by a user while the network device 1600 is installed in a wall. In one embodiment, the restore button 1610 is located inline with a bezel 1658. The restore button 1610 can be shaped to follow the contour and shape of the bezel 1658 so as to remain unobtrusive. The main switching panel 1602 can extend past the bezel 1658 so that the restore button 1610 is not inadvertently pressed.

The network device 1600 also includes a restart button 1612. The restart button 1612 may allow a user to cycle the power of network device 1600. For example, upon being depressed, the restart button 1612 may cause the network device to reboot, simulating disconnection from and reconnection to line power (e.g., an electrical supply). In some cases, the restart button 1612 can physically disconnect power to one or more elements (e.g., processors) of the network device 1600. In other cases, the restart button 1612 can simply provide a reset signal to one or more elements (e.g., processors) of the network device 1600 to cause such elements to restart.

The restart button 1612 can be located on the room-facing wall 1620 such that the button is readily accessible by a user while the network device 1600 is installed in a wall. In one embodiment, the restart button 1612 is located inline with the bezel 1658. The restart button 1612 can be shaped to follow the contour and shape of the bezel 1658 so as to remain unobtrusive. The main switching panel 1602 can extend past the bezel 1658 so that the restart button 1612 is not inadvertently tapped or pressed.

The restore button 1610 and restart button 1612 can each be located on a user-facing surface (e.g., the room-facing wall 1620) of the network device when the network device is recessed in a structure (e.g., mounted in a wall or in an electrical box).

The network device 1600 further includes electrical terminals 1608, here depicted as wires extending from the back of network device 1600 and coupled to electrical box-facing wall 1622 (as shown in FIG. 16B), for connection to line power, for providing electrical power to network device 1600, and for providing switchable electrical power to an electrical device. In some embodiments, a variety of electrical terminals are useful, including electrical wires, screw terminals, barrier terminals, push-in terminals and the like. Various electrical codes may dictate which electrical terminal types are required or permitted for network device 1600. Electrical terminals 1608 allow the network device 1600 to be connected to line power providing 200V, 120V, or other power source. In turn, an electrical device, such as an outlet, socket, light fixture or appliance, may be connected to network device 1600. Once the network device 1600 is registered according to the techniques described above, a power state or other controllable aspects of the electrical device connected to the network device 1600 may be controlled by a user using an access device (e.g., access device 108).

The network device 1600 includes a housing configured to be installed in an electrical box, similar to the placement of conventional light switches and electrical outlets. Mounting apertures 1614 are included for attaching the network device 1600 to an electrical box, such as an electrical box located inside a wall. Cover plate holes 1616 are included for attaching a wall plate over network device 1600, similar to the attachment of a switch/wall plate over a conventional light switch or electrical outlet. FIG. 16A shows room-facing wall 1620 of network device 1600. Room-facing wall 1620 of the network device 1600 and electrical box-facing wall 1622 of the network device 1600 are both shown in FIG. 16B.

The network device 1600 includes a wireless antenna 1624 mounted on room-facing wall 1620. In the embodiment shown, the wireless antenna 1624 is positioned below a room-facing surface 1621 of main switching panel 1602, so the wireless antenna 1624 is not visible to a user when looking at the room-facing wall 1620 of network device 1600. Room-facing surface 1621 is opposite wall-facing surface 1623 of main switching panel 1602 (i.e., wall-facing surface 1623 faces towards the inside of network device 1600). A circuit board 1626 is positioned within network device 1600 to include various components, such as a data processor and wireless transceiver. A transmission line 1628 connects the wireless antenna 1624 to the wireless transceiver on the circuit board 1626. In some embodiments, the transmission line 1628 is a coaxial cable, providing an electrically shielded radio frequency transmission line between the wireless antenna 1624 and the wireless transceiver. When network device 1600 is mounted in an electrical box placed in a wall, the wireless antenna 1624 will be positioned at least partially in front of a plane defined by the room-facing surface of the wall. This configuration provides the network device 1600 with the capability of reducing or minimizing interference for wireless transmissions between the wireless antenna 1624 to a wireless access point, gateway or other wireless device due to the wall, electrical box or associated building materials. In some cases, transmission line 1628 can also be configured to additionally include a transmission line for the capacitive touchscreen of main switching panel 1602. In other cases, transmission line 1628 can also be configured to additionally include a transmission line for the display of main switching panel 1602.

In some embodiments, the wireless antenna 1624 can be a three-dimensional wireless antenna. The three-dimensional wireless antenna can provide superior reception of polarized radio signals. In some embodiments, multiple wireless antennas, that are positioned a distance apart, can be used to improve upon reception when one of the antennas is located in a null path.

Because the various sensors, speakers, and displays (e.g., speakers 1648, video capture device 1640, audio capture device 1654, signal indicator 1604, and others) can be located anywhere on the room-facing wall 1620, the displays can be located on the main switching panel 1602 (e.g., as shown in FIG. 16), inline with a bezel 1658, through a cover, or elsewhere visible to a user when the network device 1600 installed.

In some embodiments, each display can include one or more light sources capable of providing one or more colors of light (e.g., a bicolor LED).

Figures 17A, 17B:
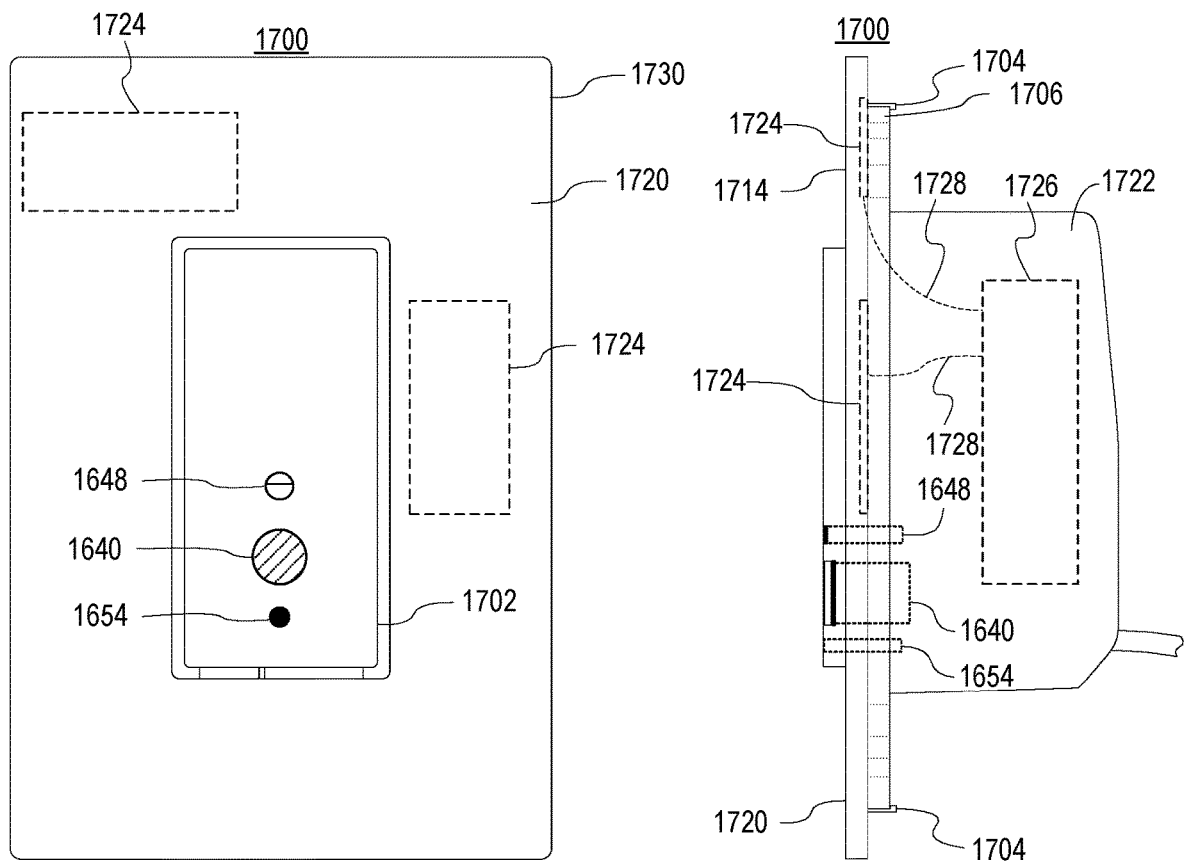
FIG. 17A is an illustration of an example of a front view of a networked device, in accordance with an embodiment of the invention.
FIG. 17B is an illustration of an example of a side view of a networked device, in accordance with an embodiment of the invention.

FIG. 17A is an illustration of an example of a front view of a networked device, in accordance with an embodiment of the invention. FIG. 17B is an illustration of an example of a side view of a networked device, in accordance with an embodiment of the invention. The network device 1700 may include any of the network devices 102, 104, or 106 described herein. Network device 1700 includes a main switching panel 1702, room-facing wall 1720, electrical box-facing wall 1722 and circuit board 1726. The network device 1700 may be similar or identical to network device 1600, but the network device 1700 includes a cover plate 1730 and two mounting apertures 1714 for mounting network device 1700 in an electrical box. The cover plate 1730 includes clips 1704 to secure the cover plate 1730 to a support plate 1706 of the network device 1700. Clips 1704 allow the cover plate 1730 to be secured to the support plate 1706 without the need to use a screw or other fastener through cover plate apertures, thus creating a clean front. Flexure of the cover plate 1730 allows clips 1704 to bend far enough to pass over the bottom and/or top of the support plate 1706 to remove and attach the cover plate 1730 to the support plate 1706.

Inclusion of the cover plate 1730 provides for the ability to mount a wireless antenna 1724 at a location that is more forward facing or proud, such that when network device 1700 is mounted in an electrical box in a wall, the wireless antenna 1724 is not placed within the wall or within the electrical box, but is located outside the wall or electrical box, minimizing or reducing wireless signal interference and/or signal degradation due to the electrical box, the wall and associated building materials. In addition, placing the wireless antenna 1724 at an external location eliminates the requirement to include a wireless antenna directly on the circuit board 1726, providing additional space on circuit board 1726 for inclusion of other components, such as sensors, power switching. For example, a large area of circuit board 1726 could be occupied by the required antennas for transmitting with sufficient gain in the 2.4 GHz or 5 GHz frequency, as about 3-6 cm in length are required for half-wavelength dipole antennas at these frequencies.

In addition, cover plate 1730 provides additional spatial area for including additional components, such as wireless antennas, switches, touchscreen interfaces, displays, and the like. As shown in FIG. 17, cover plate 1730 includes two wireless antennas 1724 mounted on room-facing wall 1720 below a surface of cover plate 1730, so the wireless antennas 1724 are not visible to a user when looking at the network device 1700 when installed into an electrical box. Wireless antennas 1724, however, may be visible from a back view of the network device 1700. Transmission lines 1728 connect the wireless antennas 1724 to wireless transceiver(s) on the circuit board 1726. Transmission lines 1728 can also connect speaker 1648, video capture device 1640, and audio capture device 1654 to circuit board 1726. When network device 1700 is mounted in an electrical box placed in a wall, the wireless antennas 1724 will be positioned at least partially in front of a plane defined by the room-facing surface of the wall. This configuration provides the network device 1700 with the capability of reducing or minimizing interference for wireless transmissions between the wireless antenna 1724 to a wireless access point, gateway or other wireless device due to the wall, electrical box or associated building materials. Additionally, the use of multiple wireless antennas 1724 optionally allows the network device 1700 to transmit at multiple frequencies (e.g., 2.4 GHz and 5 GHz), to transmit simultaneously with vertical and horizontal polarity and/or to include improved reception and transmission characteristics.

Figure 18A:
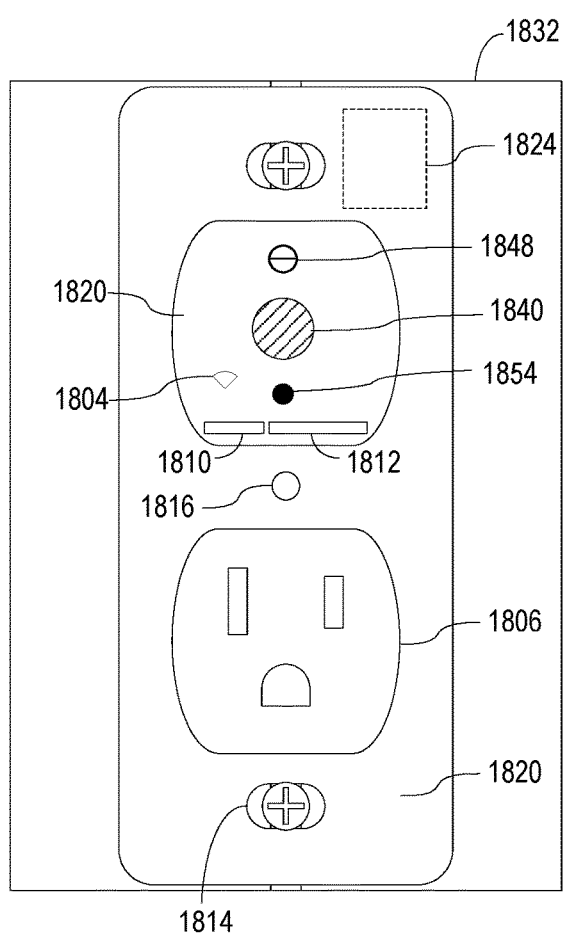
FIG. 18A is an illustration of another example of a front view of a networked device, in accordance with an embodiment of the invention.
Figure 18B:
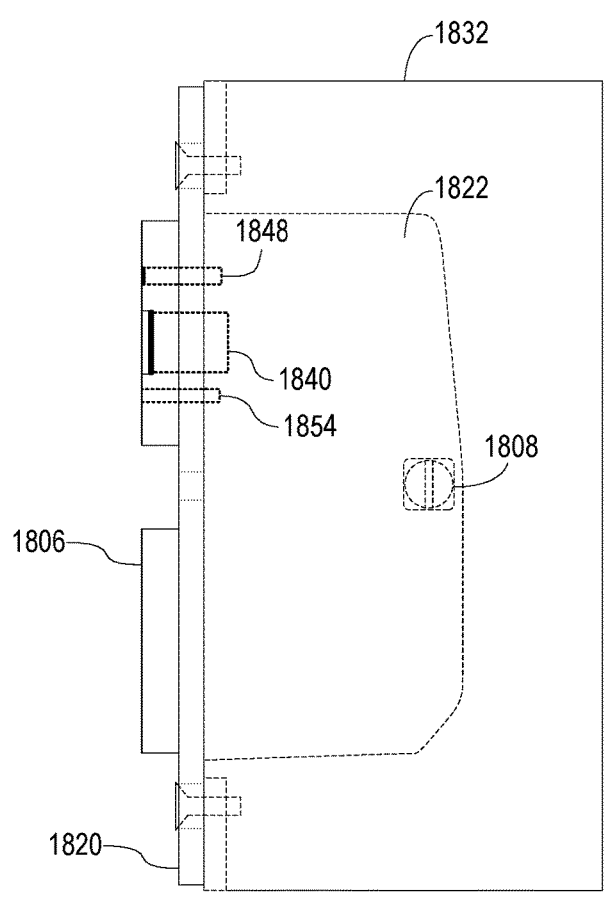
FIG. 18B is an illustration of another example of a side view of a networked device, in accordance with an embodiment of the invention.

FIG. 18A is an illustration of another example of a front view of a networked device, in accordance with an embodiment of the invention. FIG. 18B is an illustration of another example of a side view of a networked device, in accordance with an embodiment of the invention. FIGS. 18A-18B illustrate example views of network device 1800 mounted in an electrical box 1832. Network device 1800 is stylized as an in-wall outlet fixture, such as could be covered by a typical outlet cover plate. The network device 1800 may include any of the network devices 102, 104, or 106 described herein. In some embodiments, the network device 1800 may be a home automation network device. For example, the network device 1800 may include a home automation switch that may be coupled with a home appliance. A user may wirelessly access the network device 1800 in order to access, control, and/or configure various home appliances located within the user's home. For instance, the user may remotely control appliances such as a television, radio, light, microwave, iron, space heater, wall A/C unit, washer, dryer, fan, and/or the like.

In the example shown in FIGS. 18A-18B, network device 1800 can include speaker 1848, video capture device 1840 (e.g., a camera), and audio capture device 1854 (e.g., a microphone). In some cases, video capture device 1840 can include, or can optionally be, a motion sensor. In some cases, network device 1800 can include additional sensors, including optical sensors, pressure sensors, proximity or presence sensors, or other suitable sensors. Further, speaker 1848, video capture device 1840, and audio capture device 1854 can be connected to a circuit board using transmission lines, similar to network devices 1600 and 1700.

In some embodiments, the network device 1800 may include a WiFi enabled switch that connects home appliances and other electronic devices to a compatible 802.11b/g/n/ac WiFi network. The network device 1800 may thus allow users to locally or remotely turn devices on or off from anywhere, program customized notifications, and/or change device status. The network device 1800 may further allow a user to create custom schedules or have devices respond to sunrise or sunset.

In some embodiments, a light source may be integrated with or located behind the power switch. For example, a light-emitting diode (LED) may be located on a circuit board under the signal indicator 1804. The light source may be illuminated when the network device 1800 is providing power to the electrical device, and may not be illuminated when the network device 1800 is not providing power to the electrical device. In some cases, the signal indicator 1804 may indicate whether the network device 1800 has access to a communications signal, such as a WiFi signal. For example, the signal indicator 1804 may include a light source (e.g., a LED) that illuminates when the network device 1800 is connected to a communications signal. The light source may depict different colors or other characteristics (e.g., flashing, dimming, or the like) to indicate different levels of signal strength or mode of operation.

The network device 1800 includes a restore/power button 1810. The restore/power button 1810 may allow a user to reset the network device 1800 to factory default settings. For example, upon being depressed, the restore/power button 1810 may cause all software on the device to be reset to the settings that the network device 1800 included when purchased from the manufacturer. Restore/power button 1810 can also be depressed in order to change a power state of an electrical device drawing power through network device 1800. For example, if restore/power button 1810 is depressed for a short period (e.g., 1 second), then network device 1800 may be restored. However, if restore/power button 1810 is held down for a longer period (e.g., 5-10 seconds), then network device 1800 can change the power state of the electrical device drawing power through network device 1800. In some cases, network device 1800 can include a restart button 1812. The restart button 1812 may allow a user to cycle the power of network device 1800. For example, upon being depressed, the restart button 1812 may cause the network device to reboot, simulating disconnection from and reconnection to line power.

The network device 1800 further includes electrical terminals 1808, here depicted as screw terminals coupled to electrical box-facing wall 1822, for connection to line power for providing electrical power to network device 1800 and switchable electrical power to an outlet 1806. Electrical terminals 1808 allows the network device 1800 to be connected to line power providing 200V, 120V, or the like. In turn, an appliance may be connected to network device 1800 by plugging in the appliance to outlet 1806. Once the network device 1800 is registered according to the techniques described above, a power state of outlet 1806 may be controlled by a user using an access device (e.g., access device 108).

The network device 1800 includes a housing configured to be installed in an electrical box 1832, similar to the placement of light switches and electrical outlets. Mounting apertures 1814 are included for attaching the network device 1800 to electrical box 1832, such as where electrical box 1832 is mounted inside a wall. Cover plate aperture 1816 is included for attaching a wall plate over network device 1800, similar to the attachment of a switch/wall plate over a light switch or electrical outlet. FIG. 18A shows room-facing wall 1820 of network device 1800. Room-facing wall 1820 of the network device 1800 and electrical box-facing wall 1822 of the network device 1800 are both shown in FIG. 18B.

The network device 1800 includes a wireless antenna 1824 mounted on a most forward facing or proud location of room-facing wall 1820. In the embodiment shown, the wireless antenna 1824 is positioned beneath a surface of room-facing wall 1820, so the wireless antenna 1824 is not visible to a user when looking at the network device 1800. When network device 1800 is mounted in electrical box 1832 placed in a wall, the wireless antenna 1824 will be positioned at least partially in front of, and optionally fully in front of, a plane defined by the room-facing surface of the wall. This configuration provides the network device 1800 with minimized or reduced interference for wireless transmissions between the wireless antenna 1824 to a wireless access point, gateway or other wireless device due to the wall, electrical box or associated building materials as compared to a configuration where the antenna is located within the wall and/or within electrical box 1832.

It will be appreciated that the structure and components of network devices 1600, 1700, and 1800 are examples, and should not be taken as limiting. It will also be appreciated that network devices 1600, 1700, and 1800 can include additional sensors. Further, wireless antennae 1624, 1724, and 1824 can facilitate communication with other network devices and other target devices.

It will also be appreciated that network devices 1600, 1700, and 1800 can be part of the contextual intelligence system. For example, network devices 1600, 1700, and 1800 can communicate with each other. The wireless transceiver of network device 1600 can cause wireless antenna 1624 to transmit a signal that can be detected by wireless antenna 1724 of network device 1700. Further, the wireless transceiver and the data processor of circuit board 1726 can process the received signal at network device 1700. In a further example, network device 1700 can forward the received signal by causing the wireless transceiver to transmit the signal using wireless antenna 1726. The signal can be detected at wireless antenna 1824 and processed by the data processor of network device 1800.

Figure 19:
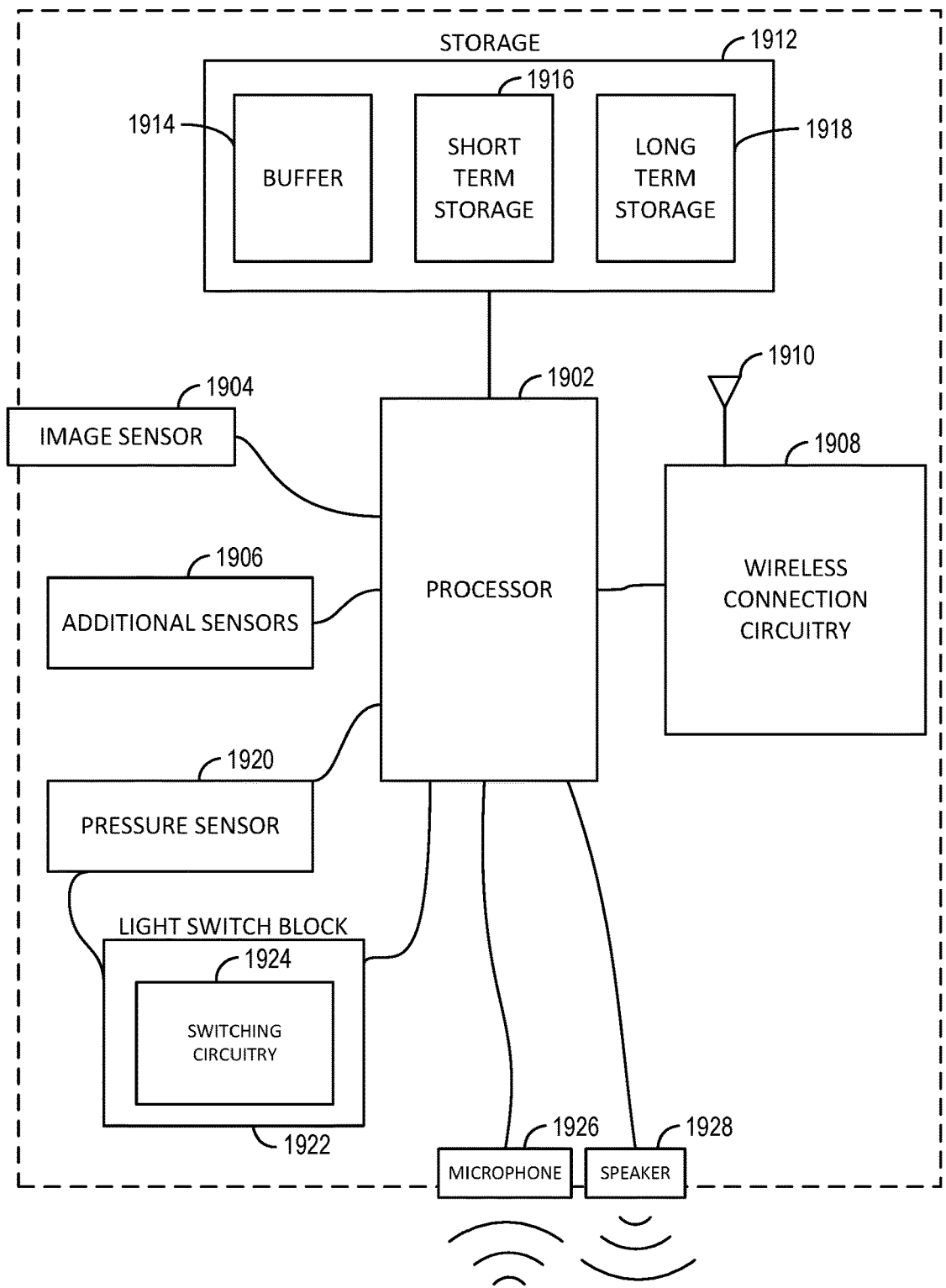
FIG. 19 is a schematic diagram of an example of a networked device according to certain aspects of the present disclosure.

FIG. 19 is a schematic diagram of an example of a networked device according to certain aspects of the present disclosure. As an example, a networked device may be a networked light switch 1900. Networked light switch 1900 can include processor 1902, image sensor 1904, additional sensors 1906, wireless connection circuitry 1908, storage 1912, pressure sensor 1920, light switch block 1922, speaker 1928, and microphone 1926. Components of networked light switch 1900 illustrated in FIG. 19 are exemplary, and more of fewer components can be included in a networked light switch device.

Processor 1902 can be one or more processors that include logical circuitry for processing instructions to drive one or more components of networked light switch 1900. Processor 1902 can also manage communications between the components of networked light switch 1900. In some cases, processor 1902 can be a microprocessor sized to fit inside networked light switch 1900. Further, processor 1902 can be coupled to any combination of one or more of image sensor 1904, additional sensors 1906, pressure sensor 1920, wireless connection circuity 1908, storage 112, and light switch block 1922.

Image sensor 1904 can be a sensor that detects light and converts the detected light into an image signal. Image sensor 1904 can be a CCD sensor, a CMOS sensor, a hybrid CCD/CMOS sensor, any image sensor based on CCD or CMOS technology, a special-purpose sensor (e.g., x-ray sensor, or other sensors), or any other type of image sensor. An image sensor can be selected for detecting images in color or in black and white.

Additional sensors 1906 can include any combination of one or more of an additional image sensor, an accelerometer, an ambient light sensor, an orientation sensor (e.g., an accelerometer, a tilt switch, or other sensor for determining orientation), a gyroscope, a remote control sensor (e.g., a sensor to sense signals from a remote control used with networked light switch 1900), a Global Positioning System (GPS) receiver to detect a position of the networked light switch 1900, an environmental sensor (e.g., a sensor to detect ambient humidity, pressure, temperature, illuminance), or other sensors.

Wireless connection circuitry 1908 can be circuitry that can facilitate wireless communication between other networked devices or an access point of a network (e.g., a private Wi-Fi network). Wireless connection circuitry 1908 can include one or more of any combination of types of wireless radios (e.g., Zigbee, Wi-Fi, multiband communication, WiMax, ANT, Near Field Communication (NFC)). Further, wireless connection circuitry 1908 can be coupled to wireless antenna 1910. Wireless antenna 1910 can include one or more antennae for facilitating transmission or reception of data (e.g., in the form of data packets). In some cases, the wireless connection circuitry 1908 can be incorporated into the processor 1902, such as examples of a CPU/Radio described herein. In some cases, wireless connection circuitry 1908 can facilitate location tracking of networked light switch 1900. For example, a location of networked light switch 1900 can be determined using Wi-Fi location tracking, which can populate the metadata of a video clip with an indication of location based on the access point connected to the networked light switch. A location of a networked light switch can also be determined using IP location tracking.

In some cases, processor 1902 can be coupled to image sensor 1904, additional sensors 1906, pressure sensor 1920, wireless connection circuitry 1908, and microphone 1926. Processor 1902 can analyze data received from image sensor 1904, additional sensors 1906, wireless connection circuitry 1908, and microphone 1926 to detect a sound (e.g., a voice command, a successful face detection, a sensed tap motion applied to the networked light switch 1900 by a user). For example, processor 1902 can compare sound data received from microphone 1926 to one or more predetermined patterns (e.g., preset or learned) to detect a voice command (e.g., "Turn on the TV."). As another example, processor 1902 can perform face detection on the video data received from image sensor 1904. Face detection can include analyzing one or more frames to determine if facial features are present, such as eyes, ears, a nose, and a mouth. Other facial features can be detected. Facial features can be detected in combination and compared with one or more patterns to determine the presence of and orientation of a face. Detection of facial features can be done through edge detection or other techniques. If the face detection is successful, processor 1902 can determine that a user is located at a particular location associated with the networked light switch 1900. As another example, processor 1902 can compare sensor data received from additional sensors 1906 to one or more patterns to determine if the sensor data corresponds to a command (e.g., a user tapping on the housing of networked light switch 1900). As another example, processor 1902 can receive an instruction from wireless connection circuitry 1908 when a user has pressed a button in an application executed by a smartphone. In some cases, a dedicated processor or component can perform live video or audio analysis.

Storage 1912 can include a buffer 1914, short-term storage 1916, and long term storage 1918. Storage 1912 can be a single memory device or multiple memory devices. Storage 1912 can include non-volatile memory, such as Random Access Memory (ROM), flash memory, or other types of memory.

Buffer 1914 can be a portion of storage 1912 (e.g., one of multiple memory devices of storage 1912 or a portion of a single memory device of storage 1912) that continuously stores real-time audio data or video data (or a portion thereof) captured by microphone 1926 or image sensor 1904, respectively. Buffer 1914 may have a preset capacity of data storage (e.g., 250 Megabytes, 500 Megabytes, 1 Gigabyte, or other sizes). In some cases, the processor 1902 can continuously store the real-time audio data into the buffer 1914. The buffer 1914 may also store parameters calculated by processor 1902. When the capacity of buffer 1914 has been reached, the processor 1902 can overwrite the stored data in the buffer 1914. For example, buffer 1914 can have a capacity for storing one minute of audio data. Other durations of buffer time can be used, such as more or less than one minute. In some cases, the duration of buffer time can be set by a user, such as by an access device.

Short-term storage 1916 can be a portion of the storage 1912 for temporarily storing real-time audio data received at the networked light switch 1900. In some cases, real-time audio data stored in the short-term storage 1916 can be deleted at any time. In some cases, the short-term storage 1916 can be removable storage (e.g., a flash card, such as an Secure Digital card).

In some cases, buffer 1914 can be coupled to short-term storage 1916, such as by processor 1902. Buffer 1914 can transfer stored audio data to short-term storage 1916. For example, a user can perform an action (e.g., speak a voice command, press a button displayed in an application on a smartphone, tap the networked light switch 1900) that is interpretable by the networked light switch 1900.

Long-term storage 1918 can be a portion of storage that can store additional information (e.g., Wi-Fi passwords, user preferences, learned-behavior, or other information). For example, a user can set networked light switch 1900 to continuously record real-time audio data for a duration of several minutes by inputting settings information relating to a several-minute time period. The settings information can be stored in long-term storage 1918.

Networked light switches can operate in one of many operating modes. In some cases, the operating mode of a networked light switch is determined using sensor data. The sensor data can be collected by sensors (e.g., additional sensors 1906) and/or pressure sensor 1920. For example, the networked light switch can analyze the sensor data collected by a capacitive touch screen to interpret an action of the networked light switch. A processor of the networked light switch (e.g., processor 1902) can reconfigure, select, set, or convert an operating mode of the networked light switch based on the input received at the capacitive touch screen.

In some cases, a processor (e.g., processor 1902) can analyze the sensor data collected by the camera or sensors (e.g., additional sensors 1906) to determine a type of motion applied to the networked light switch. The processor can reconfigure, select, set or convert an operating mode of the networked light switch based on the type of motion applied detected. Examples of types of motions detected can include a tap motion, a swipe motion, a double tapping motion, a circle motion, a pinch motion, or an un-pinch motion. Each type of motion can correspond to a unique operating mode of the networked light switch.

It will be appreciated that networked light switch 1900 can be part of the contextual intelligence system. Networked light switch 1900 can communicate with other networked devices, including, for example, network devices 1600, 1700, and 1800. For example, wireless connection circuitry 1908 can facilitate communication with wireless antennae 1624, 1724, and 1824. Further, storage 1912 can store data received from other networked devices and processor 1902 can process the received data.

Figure 20:
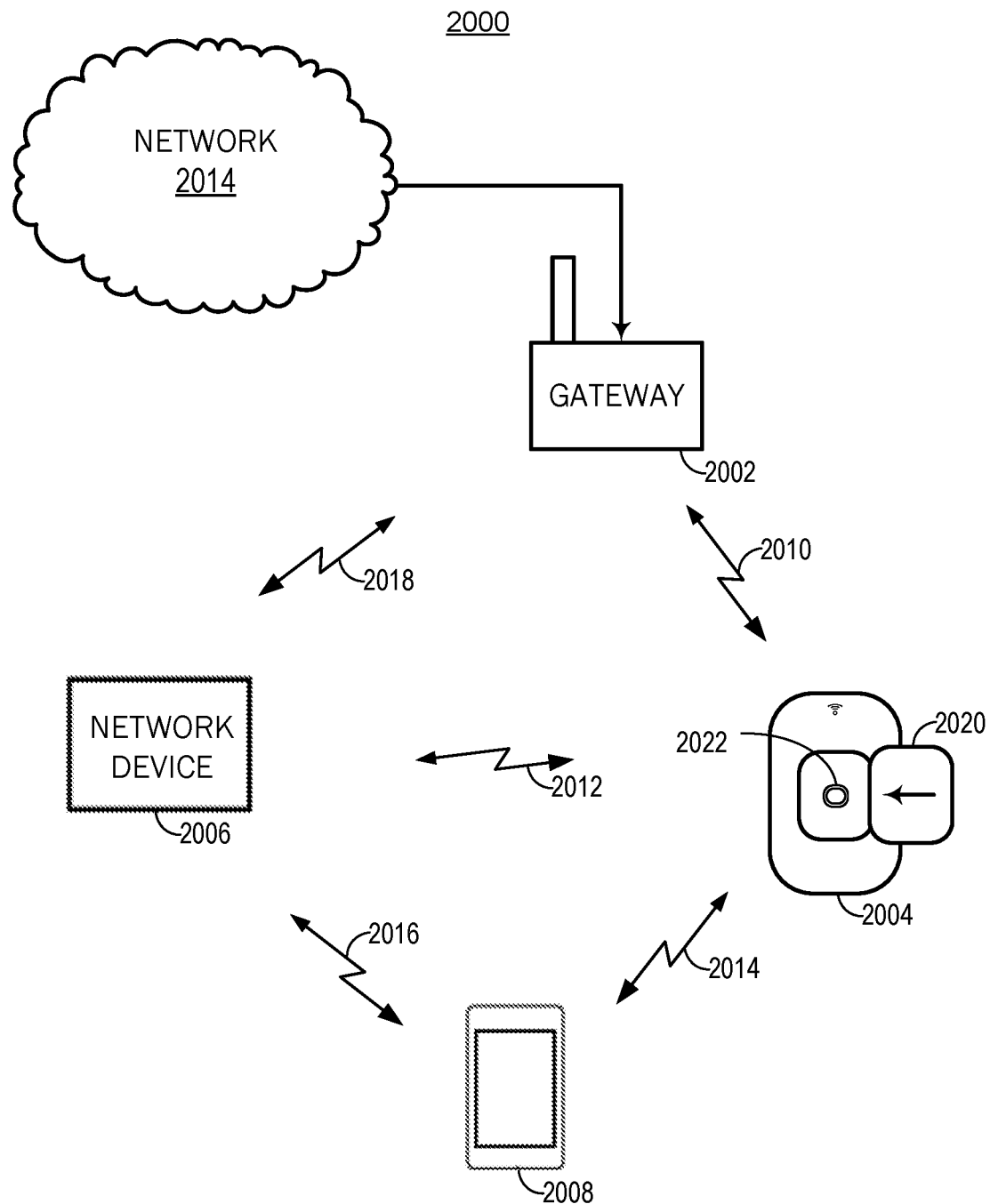
FIG. 20 is an illustration of an example of a network environment with a network video camera, in accordance with some embodiments.

FIG. 20 illustrates an example of a network 2000 that includes a network video camera 2004, according to embodiments of the present invention. Similar to the local area network 100 described above, the network 2000 also includes a network device 2006, an access device 2008, a gateway 2002, and an external network 2014. The gateway 2002, the network device 2006, the access device 2008, and the external network 2014 may be similar and have the same functionalities and capabilities as the gateway 110 or 112, the network devices 102, 104, or 106, the access device 108, and the external network 114 described above with respect to FIG. 1. The network video camera 2004 may be an IoT (network) device on an IoT network (such as, for example, network 2000 which may be an IoT network). Other network video cameras described herein within embodiments of the present invention may also be IoT (network) devices on one or more IoT networks. It should also be appreciated that the network 2000 may have other components than those depicted. Further, the embodiment shown in the figure is only one example of a network that may incorporate an embodiment of the invention. In some other embodiments, network 2000 may have more or fewer components than shown in the figure, may combine two or more components, or may have a different configuration or arrangement of components. For example, while a certain number of network video cameras, network devices, access devices, and gateways are shown in FIG. 20, one of ordinary skill in the art will appreciate that any number of network devices, access devices, and gateways may be included in the network 2000. Furthermore, other devices that are a part of or connected to network video camera 1204 may also be blocked or covered by blocking mechanism 1220. For example, a microphone, light, or other device may be blocked by blocking mechanism 1220 such that the microphone, light, etc. are deactivated or less functional because of the blocking mechanism. The microphones may be used to capture real-time audio data, such as similar to the networked light switch from other figures. In other words, the embodiments and characteristics of the described networked light switch may be incorporated into the video camera.

The foregoing description of the embodiments, including illustrated embodiments, has been presented only for the purpose of illustration and description and is not intended to be exhaustive or limiting to the precise forms disclosed. Numerous modifications and adaptations thereof will be readily apparent to those skilled in the art without departing from the spirit and scope of the present disclosure as defined in the following claims.

What is claimed is:

1. A networked device, comprising:
   one or more data processors; and
   a non-transitory computer-readable storage medium containing instructions which, when executed on the one or more data processors, cause the one or more data processors to perform operations including:
   receiving real time audio data;
   identifying a parameter of the real-time audio data, wherein the parameter identifies a characteristic of the real-time audio data;
   broadcasting the parameter, wherein broadcasting facilitates communication between a plurality of additional networked devices;
   dynamically identifying a master device from among the networked device and the plurality of additional networked devices;
   identifying a target device associated with the master device, wherein the master device is associated with a target location, wherein the target device is within the target location; and
   triggering a suspended status, wherein the suspended status indicates that the networked device is not associated with the target location, and wherein the networked device does not perform a command because of the suspended status.

2. The networked device of claim 1, further comprising:
   identifying a command;
   determining that the command corresponds to the target device; and
   transmitting an instruction, wherein receiving the instruction at the target device causes the target device to be controlled.

3. The networked device of claim 1, wherein dynamically identifying the master networked device comprises:

receiving a parameter, wherein the parameter is associated with another networked device;

comparing the identified parameter and the received parameter;

selecting one from the identified parameter and the received parameter, wherein the selected parameter satisfies a condition;

identifying a networked device associated with the selected parameter;

identifying the networked device associated with the selected parameter as the master device; and broadcasting a signal including an identification of the master device.

4. The networked device of claim 1, wherein the parameter includes an average audio intensity.

5. The networked device of claim 1, wherein dynamically identifying the master networked device comprises:

receiving an instruction, wherein the instruction identifies a networked device as the master device, and wherein the instruction is generated at a cloud server.

6. A computer-implemented method, comprising:

receiving real time audio data;

identifying a parameter of the real-time audio data, wherein the parameter identifies a characteristic of the real-time audio data;

broadcasting the parameter, wherein broadcasting facilitates communication between a plurality of additional networked devices;

dynamically identifying a master device from among the networked device and the plurality of additional networked devices;

identifying a target device associated with the master device, wherein the master device is associated with a target location, wherein the target device is within the target location; and triggering a suspended status, wherein the suspended status indicates that the networked device is not associated with the target location, and wherein the networked device does not perform a command because of the suspended status.

7. The computer-implemented method of claim 6, further comprising:

identifying a command;

determining that the command corresponds to the target device; and transmitting an instruction, wherein receiving the instruction at the target device causes the target device to be controlled.

8. The computer-implemented method of claim 6, wherein dynamically identifying the master networked device comprises:

receiving a parameter, wherein the parameter is associated with another networked device;

comparing the identified parameter and the received parameter;

selecting one from the identified parameter and the received parameter, wherein the selected parameter satisfies a condition;

identifying a networked device associated with the selected parameter;

identifying the networked device associated with the selected parameter as the master networked device; and broadcasting a signal including the identification of the master device.

9. The computer-implemented method of claim 8, wherein the parameter includes an average audio intensity.

10. The computer-implemented method of claim 6, wherein dynamically identifying the master networked device comprises:

receiving an instruction, wherein the instruction identifies a networked device as the master device, and wherein the instruction is generated at a cloud server.

* * * * *